US008722813B2

(12) United States Patent
Sawada et al.

(10) Patent No.: US 8,722,813 B2
(45) Date of Patent: May 13, 2014

(54) RESIN COMPOSITION

(75) Inventors: Hiroki Sawada, Wakayama (JP); Masahiro Mori, Wakayama (JP)

(73) Assignee: Kao Corporation, Tokyo (JP)

( * ) Notice: Subject to any disclaimer, the term of this patent is extended or adjusted under 35 U.S.C. 154(b) by 0 days.

(21) Appl. No.: 13/813,903

(22) PCT Filed: Aug. 18, 2011

(86) PCT No.: PCT/JP2011/068703
§ 371 (c)(1),
(2), (4) Date: Feb. 1, 2013

(87) PCT Pub. No.: WO2012/023589
PCT Pub. Date: Feb. 23, 2012

(65) Prior Publication Data
US 2013/0137802 A1 May 30, 2013

(30) Foreign Application Priority Data
Aug. 19, 2010 (JP) .................................. 2010-183944

(51) Int. Cl.
*C08F 283/00* (2006.01)
*C08G 63/91* (2006.01)

(52) U.S. Cl.
USPC ........... 525/418; 524/132; 524/314; 528/176; 528/190; 528/191; 528/192; 528/193; 528/196; 528/198; 528/271; 528/272

(58) Field of Classification Search
USPC .......... 524/132, 314; 528/176, 190, 193, 192, 528/196, 198, 271, 272
See application file for complete search history.

(56) References Cited

U.S. PATENT DOCUMENTS 5,281,647 A    1/1994  Eapen

FOREIGN PATENT DOCUMENTS

| JP | 7-118513 A | 5/1995 |
| JP | 10-36651 A | 2/1998 |
| JP | 2005-23091 A | 1/2005 |

OTHER PUBLICATIONS

International Search Report issued in PCT/JP2011/068703, dated Oct. 25, 2011.
Machine-Generated Translation for JP-10-36651-A, published Feb. 10, 1998.
Machine-Generated Translation for JP-2005-23091-A, published Jan. 27, 2005.
Machine-Generated Translation for JP-7-118513-A, published May 9, 1995.

*Primary Examiner* — Terressa Boykin
(74) *Attorney, Agent, or Firm* — Birch, Stewart, Kolasch & Birch, LLP

(57) ABSTRACT

A resin composition containing: an ester compound including a carboxylic acid ester obtained by using (1) a monohydric alcohol having an alkyl group having 1 to 4 carbon atoms; (2) a dicarboxylic acid having an alkylene group having 2 to 4 carbon atoms; and (3) a dihydric alcohol having an alkylene group having 2 to 6 carbon atoms, the ester compound having an acid value of 1.00 mgKOH/g or less, a hydroxyl value of 5.0 mgKOH/g or less, and a number-average molecular weight of from 300 to 700; and an aliphatic polyester. Since the resin composition of the present invention inhibits the generation of volatile compounds, the resin composition can be suitably used in various industrial applications, such as daily sundries, household electric appliance parts, and automobile parts.

20 Claims, No Drawings

RESIN COMPOSITION

TECHNICAL FIELD

The present invention relates to a resin composition. More specifically, the present invention relates to a resin composition containing an ester compound which can be suitably used as, for example, a plasticizer, and an aliphatic polyester, a molded article made of the composition, and a method for producing the composition.

BACKGROUND ART

Biodegradable resins begin to degrade in several weeks by actions of enzymes produced by microorganisms living in nature in a case where the biodegradable resins are placed in soil, sea waters, or inside the body of animals, and disappear during a period of about a year to several years. Therefore, in recent years, utilization of the resins is being remarked from the viewpoint of increased interests in environmental-friendliness.

For example, in Patent Publication 1, a resin composition having excellent water resistance and flexibility while maintaining transparency of a lactic acid-based polymer is obtained, by using a polyester-based plasticizer having a repeating unit of a dihydric alcohol, terminals of which are capped with a monobasic acid and/or a monohydric alcohol, the polyester-based plasticizer having a total of acid value and hydroxyl value of 40 or less.

In Patent Publication 2, it is reported that a resin composition having excellent flexibility and storage stability is obtained by melt-kneading a lactic acid-based polyester previously subjected to deactivation treatment of a polymerization catalyst with a chelating agent and/or an acidic phosphoric ester, with a plasticizer, and that a molded article having excellent heat resistance and solvent resistance is obtained by molding and crystallizing the composition.

PRIOR ART PUBLICATIONS

Patent Publications

Patent Publication 1: Japanese Patent Laid-Open No. Hei-7-118513
Patent Publication 2: Japanese Patent Laid-Open No. Hei-10-36651

SUMMARY OF THE INVENTION

Problems to be Solved by the Invention

In the recent year, with the increased interests in environmental-friendliness, applications of biodegradable resin compositions to automobiles are being expected. However, it is found that an internal temperature of automobiles when, for example, allowed to stand under the scorching sun in midsummer, would raise to a high temperature of 60° C. or higher; therefore, the conventional biodegradable resin compositions would generate harmful volatile gases, so that the conventional resin compositions cannot be applied to automobiles.

An object of the present invention is to provide a resin composition containing an ester compound which inhibits the generation of volatile organic compounds (VOC), and an aliphatic polyester, while maintaining the properties of a plasticizer, a molded article made of the composition, and a method for producing the composition.

Means to Solve the Problems

The present invention relates to:
[1] a resin composition containing:
an ester compound containing a carboxylic acid ester obtained by using the following (1) to (3):
(1) a monohydric alcohol having an alkyl group having 1 to 4 carbon atoms;
(2) a dicarboxylic acid having an alkylene group having 2 to 4 carbon atoms; and
(3) a dihydric alcohol having an alkylene group having 2 to 6 carbon atoms,
the ester compound having an acid value of 1.00 mgKOH/g or less, a hydroxyl value of 5.0 mgKOH/g or less, and a number-average molecular weight of from 300 to 700; and
an aliphatic polyester;
[2] a resin molded article formed by molding the resin composition as defined in the above [1];
[3] a method for producing the resin composition as defined in the above [1], including the steps of:
(step 1-1) carrying out an esterification reaction between the dicarboxylic acid as defined in the above [1] and the monohydric alcohol as defined in the above [1] to synthesize a dicarboxylic acid ester;
(step 1-2) carrying out a transesterification reaction between the dicarboxylic acid ester obtained in the step 1-1 and the dihydric alcohol as defined in the above [1], to give an ester compound containing a carboxylic acid ester, the ester compound having an acid value of 1.00 mgKOH/g or less, a hydroxyl value of 5.0 mgKOH/g or less, and a number-average molecular weight of from 300 to 700; and
(step 1-3) melt-kneading the ester compound obtained in the step 1-2 and the aliphatic polyester;
[4] a method for producing the resin composition as defined in the above [1], including the steps of:
(step 2-1) allowing to react the monohydric alcohol as defined in the above [1], the dicarboxylic acid as defined in the above [1], and the dihydric alcohol as defined in the above [1] at one time, to give an ester compound containing a carboxylic acid ester, the ester compound having an acid value of 1.00 mgKOH/g or less, a hydroxyl value of 5.0 mgKOH/g or less, and a number-average molecular weight of from 300 to 700; and
(step 2-2) melt-kneading the ester compound obtained in the step 2-1 and the aliphatic polyester.

Effects of the Invention

Since the resin composition of the present invention has excellent plasticity and inhibits the generation of volatile organic compounds (VOC) even at high temperatures, the resin composition can be suitably used in automobile applications and the like.

MODES FOR CARRYING OUT THE INVENTION

The resin composition of the present invention contains:
an ester compound containing a carboxylic acid ester obtained by using the following (1) to (3):
(1) a monohydric alcohol having an alkyl group having 1 to 4 carbon atoms;
(2) a dicarboxylic acid having an alkylene group having 2 to 4 carbon atoms; and (3) a dihydric alcohol having an alkylene group having 2 to 6 carbon atoms,
the ester compound having an acid value of 1.00 mgKOH/g or less, a hydroxyl value of 5.0 mgKOH/g or less, and a number-average molecular weight of from 300 to 700; and
   an aliphatic polyester.
   (Ester Compound)
The ester compound in the present invention includes the following carboxylic acid ester. The carboxylic acid ester is obtained by using the following (1) to (3):
(1) a monohydric alcohol having an alkyl group having 1 to 4 carbon atoms;
(2) a dicarboxylic acid having an alkylene group having 2 to 4 carbon atoms; and
(3) a dihydric alcohol having an alkylene group having 2 to 6 carbon atoms, and
the carboxylic acid ester acts as plasticizer.

In general, many of the plasticizers for polyester resins are polymer compounds having high acid values and hydroxyl values. When the above compound is blended in a polyester resin, since the plasticizer for polyester resins has an acidic group, e.g. a carboxyl group, or a hydroxyl group, the plasticizer reacts with the polyester resin, so that the polyester resin is degraded, thereby making it likely to generate volatile organic compounds (VOC). In addition, these polymer compounds are more likely to bleed out, which in turn undergo air oxidation on the resin surface, thereby also making it likely to generate volatile organic compounds (VOC). In view of the above, in the present invention, a compound having a low acid value and a low hydroxyl value is used, so that the generation of volatile organic compounds (VOC) due to degradation of the aliphatic polyester is inhibited, and at the same time compatibility with the aliphatic polyester is increased, so that bleeding resistance is improved, and that air oxidation on the surface of the aliphatic polyester is reduced, whereby the generation of volatile organic compounds (VOC) can be inhibited. From the above viewpoints, a specified ester compound containing a carboxylic acid ester obtained by using the above (1) to (3) is used. Specific examples of the carboxylic acid ester include a compound represented by the following formula (I):

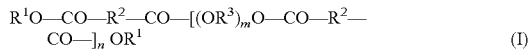

$$R^1O-CO-R^2-CO-[(OR^3)_mO-CO-R^2-CO-]_nOR^1 \quad (I)$$

wherein $R^1$ is an alkyl group having 1 to 4 carbon atoms; $R^2$ is an alkylene group having 2 to 4 carbon atoms; $R^3$ is an alkylene group having 2 to 6 carbon atoms; m is the number of from 1 to 6: and n is the number of from 1 to 6, with proviso that all the $R^2$s may be identical or different, and that all the $R^3$s may be identical or different.

Accordingly, it is preferable that the resin composition of the present invention contains:
   an ester compound containing the carboxylic acid ester represented by the formula (I) obtained by using the above (1) to (3), the ester compound having an acid value of 1.00 mgKOH/g or less, a hydroxyl value of 5.0 mgKOH/g or less, and a number-average molecular weight of from 300 to 700; and
   an aliphatic polyester.

It is deduced that since both the carboxylic acid ester represented by the formula (I) and the aliphatic polyester are chained compounds, appropriate interactions therebetween can be obtained, so that the compatibility with the aliphatic polyester is improved, thereby improving plasticity. In the present specification, the properties of the plasticizer can be confirmed by flexural modulus (G/Pa), heat resistance (heat deformation temperature, ° C.), and bleeding resistance of the molded article. In the present invention, $[(OR^3)_mO-CO-R^2-CO-]$ in the formula (I) is also referred to as a repeating unit in the formula (I).

In addition, the ester compound containing a carboxylic acid ester represented by the formula (I) has a low acid value and a low hydroxyl value, i.e. an acid value of 1.00 mgKOH/g or less, and preferably 0.90 mgKOH/g or less, and a hydroxyl value of 5.0 mgKOH/g or less, and preferably 4.0 mgKOH/g or less. Moreover, it is deduced that since the terminals of the carboxylic acid ester represented by the formula (I) are subjected to capping, the reactivity with the aliphatic polyester is low, so that the degradation of the aliphatic polyester is lowered, whereby the generation of the volatile organic compounds is more inhibited. In the present specification, the acid value and the hydroxyl value of the ester compound can be measured in accordance with the methods described in Examples set forth below.

The ester compound containing a carboxylic acid ester represented by the formula (I) has an acid value of 1.00 mgKOH/g or less, and preferably 0.90 mgKOH/g or less, and an acid value of preferably 0.05 mgKOH/g or more, and more preferably 0.1 mgKOH/g or more. In addition, the ester compound has a hydroxyl value of 5.0 mgKOH/g or less, and preferably 4.0 mgKOH/g or less, and a hydroxyl value of preferably 0.1 mgKOH/g or more, and more preferably 0.2 mgKOH/g or more.

$R^1$ in the formula (I) is an alkyl group having 1 to 4 carbon atoms, and two alkyl group moieties are present in one molecule at both terminals of the molecule. $R^1$ may be linear or branched, so long as it has 1 to 4 carbon atoms. The alkyl group has preferably 1 to 4 carbon atoms, and more preferably 1 to 2 carbon atoms, from the viewpoint of improving compatibility with the aliphatic polyester, thereby exhibiting plasticization effects. Specific examples include a methyl group, an ethyl group, a propyl group, an isopropyl group, a butyl group, a sec-butyl group, a tert-butyl group, and an iso-butyl group, among which a methyl group and an ethyl group are preferred, and a methyl group is more preferred, from the viewpoint of improving compatibility with the aliphatic polyester, thereby exhibiting plasticization effects.

$R^2$ in the formula (I) is an alkylene group having 2 to 4 carbon atoms, and a preferred example includes a linear alkylene group. Specific examples include an ethylene group, a 1,3-propylene group, and a 1,4-butylene group. Among them, an ethylene group and a 1,3-propylene group are preferred, and an ethylene group is more preferred, from the viewpoint of improving compatibility with the aliphatic polyester, thereby exhibiting plasticizing effects, and an ethylene group and a 1,4-butylene group are preferred, and an ethylene group is more preferred, from the viewpoint of exhibiting plasticization effects and from the viewpoint of economic advantages. Here, all the $R^2$s may be identical to or different from each other.

$R^3$ in the formula (I) is an alkylene group having 2 to 6 carbon atoms, which is present in the repeating unit in the form of an oxyalkylene group. $R^3$ may be linear or branched, so long as it has 2 to 6 carbon atoms. The alkylene group has preferably 2 to 6 carbon atoms, and more preferably 2 to 3 carbon atoms, from the viewpoint of improving compatibility with the aliphatic polyester, thereby exhibiting plasticization effects. Specific examples include an ethylene group, a 1,2-propylene group, a 1,3-propylene group, a 1,2-butylene group, a 1,3-butylene group, a 1,4-butylene group, a 2-methyl-1,3-propylene group, a 1,2-pentylene group, a 1,4-pentylene group, a 1,5-pentylene group, a 2,2-dimethyl-1,3-propylene group, a 1,2-hexylene group, a 1,5-hexylene group, a 1,6-hexylene group, a 2,5-hexylene group, and a 3-methyl-1, 5-pentylene group. Among them, an ethylene group, a 1,2-propylene group, and a 1,3-propylene group are preferred, from the viewpoint of improving compatibility with the aliphatic polyester, thereby exhibiting plasticization effects. Here, all the $R^3$s may be identical to or different from each other.

m is the number of an average repeat of oxyalkylene groups, which is a number of from 1 to 6. When m is greater, the ether group value of the carboxylic acid ester represented by the formula (I) increases, so that oxidation is more likely to take place and its stability is lowered, thereby making it more likely to generate the VOC. m is preferably a number of from 1 to 4, and more preferably a number of from 1 to 3, from the viewpoint of improving compatibility with the aliphatic polyester and from the viewpoint of inhibiting the generation of VOC.

n is the number of an average repeat (average degree of polymerization) of the repeating units, which is a number of from 1 to 6. n is preferably a number of from 1 to 4, from the viewpoint of improving compatibility with the aliphatic polyester, thereby improving plasticization effects and plasticization efficiency. Here, in the present specification, the average degree of polymerization can be calculated in accordance with the method described in Examples set forth below.

Specific examples of the compound represented by the formula (I) include:
an ester where $R^1$ is a methyl group, $R^2$ is an ethylene group, $R^3$ is an ethylene group, m is 2, and n is 1.5;
an ester where $R^1$ is an ethyl group, $R^2$ is a 1,4-butylene group, $R^3$ is a 1,3-propylene group, m is 1, and n is 2;
an ester where $R^1$ is a butyl group, $R^2$ is a 1,3-propylene group, $R^3$ is an ethylene group, m is 3, and n is 1.5;
an ester where $R^1$ is a methyl group, $R^2$ is an ethylene group, $R^3$ is a 1,6-hexylene group, m is 1, and n is 3; and the like. These compounds can be contained alone or in a mixture of two or more kinds. Among them, a compound where all the $R^1$s are methyl groups, $R^2$ is an ethylene group or a 1,4-butylene group, $R^3$ is an ethylene group or a 1,3-propylene group, m is the number of from 1 to 3, and n is the number of from 1 to 4 is preferred, and a compound where all the $R^1$s are methyl groups, $R^2$ is an ethylene group or a 1,4-butylene group, $R^3$ is an ethylene group or a 1,3-propylene group, m is the number of from 1 to 3, and n is the number of from 1 to 3 is more preferred.

Next, (1) to (3) which are used as raw materials for the above-mentioned ester compound will be explained.

(1) Monohydric Alcohol Having Alkyl Group Having 1 to 4 Carbon Atoms

The monohydric alcohol having an alkyl group having 1 to 4 carbon atoms is an alcohol containing the above $R^1$. Specific examples include methanol, ethanol, 1-propanol, 2-propanol, 1-butanol, 2-butanol, 2-methyl-1-propanol, and 1,1-dimethyl-1-ethanol. Among them, methanol, ethanol, 1-propanol, and 1-butanol are preferred, methanol and ethanol are more preferred, and methanol is even more preferred, from the viewpoint of increasing transesterification reaction efficiency, in addition to the viewpoint of improving compatibility with the aliphatic polyester, thereby exhibiting plasticization effects.

(2) Dicarboxylic Acid Having Alkylene Group Having 2 to 4 Carbon Atoms

The dicarboxylic acid having an alkylene group having 2 to 4 carbon atoms is a dicarboxylic acid including the above $R^2$. Specific examples include succinic acid, glutaric acid, adipic acid, and derivatives thereof, e.g. succinic anhydride, glutaric anhydride, dimethyl succinate, dibutyl succinate, dimethyl glutarate, dimethyl adipate. Among them, succinic acid, glutaric acid, and derivatives thereof, e.g. succinic anhydride, glutaric anhydride, dimethyl succinate, dibutyl succinate, dimethyl glutarate, are preferred, and succinic acid and derivatives thereof, e.g. succinic anhydride, dimethyl succinate, are more preferred, from the viewpoint of improving compatibility with the aliphatic polyester, thereby exhibiting plasticization effects. Also, succinic acid, adipic acid and derivatives thereof, e.g. succinic anhydride, dimethyl succinate, dibutyl succinate, dimethyl adipate, are preferred, and succinic acid and derivatives thereof, e.g. succinic anhydride, dimethyl succinate, dibutyl succinate, are more preferred, from the viewpoint of exhibiting plasticization effects and from the viewpoint of economic advantages.

(3) Dihydric Alcohol Having Alkylene Group Having 2 to 6 Carbon Atoms

The dihydric alcohol having an alkylene group having 2 to 6 carbon atoms is a dihydric alcohol including the above $R^3$. Specific examples include ethylene glycol, diethylene glycol, triethylene glycol, tetraethylene glycol, 1,2-propanediol, 1,3-propanediol, 2-methyl-1,3-propanediol, 2,2-dimethyl-1,3-propanediol, 1,2-butanediol, 1,3-butanediol, 1,4-butanediol, 2-methyl-1,3-propanediol, 1,2-pentanediol, 1,4-pentanediol, 1,5-pentanediol, 2,2-dimethyl-1,3-propanediol, 2,5-hexanediol, 1,6-hexanediol, 2,5-hexanediol, and 3-methyl-1,5-pentanediol. Among them, diethylene glycol, triethylene glycol, 1,2-propanediol, 1,3-propanediol, tetraethylene glycol, and 1,4-butanediol are preferred, diethylene glycol, triethylene glycol, 1,2-propanediol, and 1,3-propanediol are more preferred, and diethylene glycol, triethylene glycol, and 1,3-propanediol are even more preferred, from the viewpoint of improving compatibility with the aliphatic polyester, thereby exhibiting plasticization effects.

Accordingly, as the above (1) to (3), in a preferred embodiment, (1) a monohydric alcohol is at least one member selected from the group consisting of methanol, ethanol, 1-propanol, and 1-butanol, (2) a dicarboxylic acid is at least one member selected from the group consisting of succinic acid, glutaric acid, and derivatives thereof, and (3) a dihydric alcohol is at least one member selected from the group consisting of diethylene glycol, triethylene glycol, 1,2-propanediol, 1,3-propanediol, tetraethylene glycol, and 1,4-butanediol, in a more preferred embodiment, (1) a monohydric alcohol is at least one member selected from the group consisting of methanol and ethanol, (2) a dicarboxylic acid is at least one member selected from the group consisting of succinic acid, glutaric acid, and derivatives thereof, and (3) a dihydric alcohol is at least one member selected from the group consisting of diethylene glycol, triethylene glycol, 1,2-propanediol, and 1,3-propanediol, and in an even more preferred embodiment, an embodiment where (1) a monohydric alcohol is methanol, (2) a dicarboxylic acid is at least one member selected from the group consisting of succinic acid and derivatives thereof, and (3) a dihydric alcohol is at least one member selected from the group consisting of diethylene glycol, triethylene glycol, and 1,3-propanediol.

The method for obtaining an ester compound by using the above (1) to (3) is not particularly limited, and includes, for example, the methods of the following Embodiment 1 and Embodiment 2:

Embodiment 1 a method including the steps of:

carrying out an esterification reaction between (2) the dicarboxylic acid and (1) the monohydric alcohol to synthesize a dicarboxylic acid ester (step 1); and carrying out an esterification reaction between the dicarboxylic acid ester obtained and (3) the dihydric alcohol (step 2); and

Embodiment 2 a method including the steps of allowing to react (1) the monohydric alcohol, (2) the dicarboxylic acid, and (3) the dihydric alcohol at one time.

Among these embodiments, the method of Embodiment 1 in which the'aliphatic polyester alcoholysis is less likely to take place is preferred, from the viewpoint of adjusting an average degree of polymerization.

The method of Embodiment 1 will be explained hereinbelow.

Embodiment 1 is a method including carrying out a transesterification reaction between a dicarboxylic acid ester, which is a reaction product of a dicarboxylic acid and a monohydric alcohol, and a dihydric alcohol. In the present specification, the method of Embodiment 1 is also referred to as a transesterification reaction.

Specifically, first, the step 1 of Embodiment 1 includes carrying out an esterification reaction between (2) the dicarboxylic acid and (1) the monohydric alcohol to synthesize a dicarboxylic acid ester. The esterification method include, for example, a dehydration esterification method including adding (1) a monohydric alcohol to a mixture of (2) a dicarboxylic acid and a catalyst while stirring, and removing water produced or the monohydric alcohol to the external of the system. Specific examples include:

1) a method including blowing steam of a monohydric alcohol in a dicarboxylic acid to carry out an esterification reaction, and at the same time removing water produced and an unreacted monohydric alcohol;

2) a method including carrying out an esterification reaction using a monohydric alcohol in excess, and at the same time azeotropically distilling water produced and the monohydric alcohol to remove these components;

3) a method including carrying out an esterification reaction, and at the same time adding a solvent for carrying out azeotropic distillation with water or water, a monohydric alcohol or the like, e.g. toluene, to remove water and an alcohol; and the like.

The catalyst includes inorganic acids such as sulfuric acid, phosphoric acid, methanesulfonic acid, and paratoluenesulfonic acid; or organic acids. Among them, paratoluenesulfonic acid is preferred. The amount of the catalyst used is preferably from 0.05 to 10 mol, and more preferably from 0.10 to 3 mol, based on 100 mol of the dicarboxylic acid.

The monohydric alcohol and the dicarboxylic acid are in a molar ratio, i.e. monohydric alcohol/dicarboxylic acid, of preferably from 2/1 to 20/1, and more preferably from 3/1 to 12/1, from the viewpoint of improvement in the reaction percentage and economic advantages. Here, the term "reaction percentage" in this case means a percentage at which the raw materials used in the reaction are allowed to react, based on the dicarboxylic acid.

Although the reaction temperature may depend upon the kinds of the monohydric alcohol used, the reaction temperature is preferably from 50° to 200° C., and more preferably from 80° to 140° C., from the viewpoint of improvement in reaction percentage and inhibition of side reactions. The reaction time is preferably from 0.5 to 15 hours, and more preferably from 1.0 to 5 hours. Here, the reaction may be carried out under a reduced pressure, and the pressure is preferably reduced to a range from 2.7 to 101.3 kPa, and more preferably to a range from 6.7 to 101.3 kPa.

The dicarboxylic acid ester obtained has an alkyl esterification percentage based on the two molecular terminals of preferably 90% or more, more preferably 95% or more, and even more preferably 98% or more. Here, the alkyl esterification percentage as used herein can be calculated in accordance with the method described in Examples set forth below.

The dicarboxylic acid thus obtained is used in the step 2. In the present invention, in the dicarboxylic acid ester a reaction product obtained as mentioned above may be used, or a commercially available product may be used, and a commercially available product may be used in the step 2. Preferred commercially available products include dimethyl succinate (manufactured by Wako Pure Chemicals Industries, Ltd.) and dimethyl adipate (manufactured by Wako Pure Chemicals Industries, Ltd.).

The step 2 of Embodiment 1 includes carrying out a transesterification reaction between the dicarboxylic acid ester and (3) the dihydric alcohol.

Specifically, the transesterification reaction includes, for example, a transesterification reaction including continuously adding (3) a dihydric alcohol to a mixture of a dicarboxylic acid ester and a catalyst, and removing a monohydric alcohol produced to an external of the system; or a transesterification reaction including continuously adding a dicarboxylic acid ester to a mixture of (3) a dihydric alcohol and a catalyst, and removing a monohydric alcohol produced to an external of the system. In both cases, the monohydric alcohol produced is distilled off, so that the equilibrium is shifted, whereby the reaction can be progressed. Also, the catalyst may be added stepwise, and for example, a catalyst can be allowed to be present upon supplying a dihydric alcohol to a dicarboxylic acid ester, or supplying a dicarboxylic acid ester to a dihydric alcohol, and the catalyst can be further added in the stage of removing a monohydric alcohol produced to an external of the system. Here, the dicarboxylic acid ester used in the transesterification reaction can be directly a reaction mixture obtained in the above-mentioned esterification reaction or commercially available product, or can be a product after distillation and isolation thereof.

The catalyst includes, in addition to the inorganic acids such as sulfuric acid, phosphoric acid, methanesulfonic acid, and paratoluenesulfonic acid; or the organic acids mentioned above, organometallic compounds such as tetraisopropoxytitanium and tetrabutoxytitanium; alkali alkoxides such as sodium methoxide; and the like. Among them, paratoluenesulfonic acid, tetraisopropoxytitanium, tetrabutoxytitanium, and sodium methoxide are preferred. The amount of the catalyst used is such that the amount of paratoluenesulfonic acid or sodium methoxide used is preferably from 0.05 to 10 mol, and more preferably from 0.10 to 5 mol, that the amount of tetraisopropoxytitanium or tetrabutoxytitanium used is preferably from 0.0001 to 0.1 mol, and more preferably 0.0005 to 0.05 mol, each amount based on 100 mol of the dicarboxylic acid ester. Here, the amount of the catalyst used as referred to herein is a total amount of the catalyst used in the step 2.

The dicarboxylic acid ester and the dihydric alcohol are in a molar ratio, i.e. dicarboxylic acid ester/dihydric alcohol, of preferably from 1.1/1 to 15/1, more preferably from 1.5/1 to 4/1, and even more preferably from 2.0/1 to 4/1, from the viewpoint of controlling the molecular weight of the ester compound in the present invention.

The reaction temperature is preferably from 50° to 250° C., and more preferably from 60° to 150° C., from the viewpoint of improving the reaction percentage and inhibiting side reactions. In this case, "the reaction percentage" means a percentage at which the raw materials used in the reaction are allowed to react, based on the dihydric alcohol. The reaction time is preferably from 0.1 to 10 hours, and more preferably from 1 to 10 hours. Here, the reaction may be carried out under a reduced pressure, and the pressure is reduced to preferably from 0.7 to 101.3 kPa, and more preferably from 2.0 to 101.3 kPa.

The method of Embodiment 2 will be explained hereinbelow.

The method of Embodiment 2 is a method including allowing to react (1) the monohydric alcohol, (2) the dicarboxylic acid, and (3) the dihydric alcohol, and optionally a catalyst at one time. In the present specification, the method of Embodiment 2 is also referred to as a one-time addition reaction.

The raw materials can be supplied at one time or in divided parts, and the monohydric alcohol may be introduced into a reactor in divided parts or continuously.

The catalyst includes inorganic acids such as sulfuric acid, phosphoric acid, methanesulfonic acid, and paratoluenesulfonic acid; or organic acids. Among them, paratoluenesulfonic acid is preferred. The amount of the catalyst used is preferably from 0.05 to 10 mol, and more preferably from 0.10 to 5 mol, based on 100 mol of the dicarboxylic acid.

The dicarboxylic acid, the monohydric alcohol, and the dihydric alcohol are in a molar ratio, i.e. dicarboxylic acid/ monohydric alcohol/dihydric alcohol, of preferably from 1.1/ 1.1/1 to 15/100/1, more preferably from 1.5/3/1 to 5/30/1, and even more preferably from 2.0/5/1 to 5/20/1, from the viewpoint of controlling the molecular weight of the ester compound in the present invention.

Also, the dicarboxylic acid and the dihydric alcohol are in a molar ratio, i.e. dicarboxylic acid/dihydric alcohol, of preferably from 1.5/1 to 5/1, from the viewpoint of controlling the molecular weight of the ester compound in the present invention.

The reaction temperature may depend upon the kinds of the alcohols used, and the reaction temperature is preferably from 50° to 200° C., and the reaction time is preferably from 0.5 to 15 hours. The reaction may be carried out at a reduced pressure, and preferably at a pressure of from 6.7 to 101.3 kPa. In addition, the reaction may be carried out at a temperature of from 70° to 140° C. under a normal pressure, i.e. 101.3 kPa, for 3 to 5 hours, removing water produced and the monohydric alcohol, and thereafter aging the reaction mixture at a temperature of from 70° to 120° C. and pressure of from 0.7 to 26.7 kPa for 0.5 to 3 hours.

In addition, in the present invention, as Embodiment 3, an esterification reaction (dehydration esterification reaction) is carried out between (2) the dicarboxylic acid and (3) the dihydric alcohol mentioned above to synthesize a dicarboxylic acid ester, and thereafter an esterification reaction (dehydration esterification reaction) may be further carried out between the dicarboxylic acid ester obtained and (1) the monohydric alcohol.

Here, from the reaction product obtained, the unreacted raw materials and the side products may be distilled off in accordance with a known method.

Thus, an ester compound containing a carboxylic acid ester represented by the formula (I) is obtained according to the above esterification method.

The ester compound in the present invention has a saponification value of preferably from 500 to 800 mgKOH/g, and more preferably from 600 to 750 mgKOH/g, from the viewpoint of satisfying both the compatibility with the resin and the inhibition of the VOC generated from the resin composition. Here, in the present specification, the saponification value of the ester compound can be measured in accordance with the method described in Examples set forth below.

The ester compound in the present invention has a number-average molecular weight of from 300 to 700, preferably from 300 to 600, more preferably from 350 to 600, and even more preferably from 350 to 500, from the viewpoint of improving volatility resistance and plasticization efficiency. Since the ester compound has a number-average molecular weight of 300 or more, the resin composition has favorable volatility resistance, so that the evaporation of the ester compound from the resin composition is inhibited, whereby reducing the lowering in the physical properties, such as flexural modulus, heat resistance and bleeding resistance, of the resin composition molded article with passage of time. Here, in the present specification, the molecular weight of the ester compound can be calculated in accordance with the method described in Examples set forth below.

The ester compound in the present invention has an alkyl esterification percentage to the two molecular terminals, i.e. a terminal alkyl esterification percentage, of preferably 95% or more, and more preferably 98% or more, from the viewpoint of improving compatibility with the aliphatic polyester, thereby exhibiting plasticization effects, and from the viewpoint of improving plasticization efficiencies.

The ester compound in the present invention has an ether group value of preferably from 0 to 8 mmol/g, more preferably from 0 to 6 mmol/g, even more preferably from 1 to 6 mmol/g, and even more preferably from 1 to 5 mmol/g, from the viewpoint of satisfying both the compatibility with the resin and the inhibition of the VOC generated from the resin composition. Here, in the present specification, the ether group value of the ester compound can be calculated in accordance with the method described in Examples set forth below.

Accordingly, in one embodiment of the ester compound in the present invention, for example, in a preferred embodiment, an ester compound containing a carboxylic acid ester obtained by using the above (1) to (3), the ester compound having an acid value of 1.00 mgKOH/g or less, a hydroxyl value of 5.0 mgKOH/g or less, a number-average molecular weight of from 300 to 700, and an ether group value of from 0 to 8 mmol/g, in a more preferred embodiment, an ester compound containing a carboxylic acid ester obtained by using the above (1) to (3), the ester compound having an acid value of 0.05 mgKOH/g or more and 1.00 mgKOH/g or less, a hydroxyl value of 0.1 mgKOH/g or more and 5.0 mgKOH/g or less, a number-average molecular weight of from 300 to 600, and an ether group value of from Q to 8 mmol/g, in an even more preferred embodiment, an ester compound containing a carboxylic acid ester obtained by using the above (1) to (3), the ester compound having an acid value of 0.05 mgKOH/g or more and 0.90 mgKOH/g or less, a hydroxyl value of 0.1 mgKOH/g or more and 4.0 mgKOH/g or less, a number-average molecular weight of from 300 to 600, and an ether group value of from 0 to 6 mmol/g, and in an even more preferred embodiment, an ester compound containing a carboxylic acid ester obtained by using the above (1) to (3), the ester compound having an acid value of 0.1 mgKOH/g or more and 0.90 mgKOH/g or less, a hydroxyl value of 0.2 mgKOH/g or more and 4.0 mgKOH/g or less, a number-average molecular weight of from 350 to 500, and an ether group value of from 1 to 5 mmol/g.

Since the ester compound in the present invention, while having excellent plasticization effects, inhibits the generation of the volatile organic compounds (VOC), the ester compound can be blended with the aliphatic polyester and suitably used. The above-mentioned ester compound is contained in the resin composition of the present invention in an amount of preferably from 1 to 50 parts by weight, and more preferably from 5 to 30 parts by weight, based on 100 parts by weight of the aliphatic polyester.

(Aliphatic Polyester)

The aliphatic polyester in the present invention includes polyhydroxy butyrate, polycaprolactone, polybutylene succinate, polybutylene succinate/adipate, polyethylene succinate, polylactic acid resin, polymalic acid, polyglycolic acid, polydioxanone, poly(2-oxetanone), and the like, and it is preferable that the aliphatic polyester has biodegradability. Among them, the polybutylene succinate and the polylactic acid resin are preferred, and the polylactic acid resin are more preferred, because of having excellent processability, economic advantages, availability, and physical properties. Here, in the present invention, natural polymers such as starch, cellulose, chitin, chitosan, gluten, gelatin, zein, soybean protein, collagen, and keratin and the above-mentioned aliphatic polyester can be also suitably used.

It is preferable that the polylactic acid resin has biodegradability, which is capable of being degraded to low molecular compounds by microorganisms in nature. The polylactic acid resin contains a polylactic acid obtained by polycondensing lactic acid components alone as raw material monomers, and/or a polylactic acid obtained by polycondensing a lactic acid component and a hydroxycarboxylic acid component other than lactic acid (hereinafter simply referred to as a hydroxycarboxylic acid component) as raw material monomers. Here, the term "biodegradable or biodegradability" as used herein refers to a property which is capable of being degraded to low molecular compounds by microorganisms in nature. Specifically, the term means biodegradability based on "test on aerobic and ultimate biodegradation degree and disintegration degree under controlled aerobic compost conditions" of JIS K6953 (ISO 14855).

Lactic acids exist in the form of optical isomers, L-lactic acid (L-form) and D-lactic acid (D-form). In the present invention, the lactic acid component may contain either one of the optical isomers or both, and it is preferable to use a lactic acid having high optical purity, which contains either one of the optical isomers as a main component, from the viewpoint of improving moldability of the resin composition. The term "main component" as used herein refers to a component that is contained in an amount of 50% by mol or more of the lactic acid component.

On the other hand, the hydroxycarboxylic acid component includes hydroxycarboxylic acid compounds such as glycolic acid, hydroxybutyric acid, hydroxyvaleric acid, hydroxypentanoic acid, and hydroxycaproic acid, which can be used alone or in a combination of two or more kinds. Among them, glycolic acid and hydroxycaproic acid are preferred, from the viewpoint of improving heat resistance and transparency of the resin composition.

In addition, in the present invention, the dimers of the lactic acid and the hydroxycarboxylic acid compound mentioned above may be contained in the respective component. Preferred examples include D-lactide and L-lactide, from the viewpoint of improving heat resistance and transparency of the resin composition. Here, the lactic acid dimer may be contained in the lactic acid component in either one of the embodiment where the lactic acid components alone are polycondensed, or the embodiment where the lactic acid component and the hydroxycarboxylic acid component are polycondensed.

The lactic acid dimer is contained in an amount of preferably from 80 to 100% by mol, and more preferably from 90 to 100% by mol, of the lactic acid component, from the viewpoint of improving heat resistance of the resin composition.

The dimer of the hydroxycarboxylic acid compound is contained in an amount of preferably from 80 to 100% by mol, and more preferably from 90 to 100% by mol, of the hydroxycarboxylic acid component, from the viewpoint of improving heat resistance of the resin composition.

The polycondensation reaction of the lactic acid components alone, and the polycondensation reaction of the lactic acid component and the hydroxycarboxylic acid component can be carried out, but not particularly limited to, using known methods.

The raw material monomers are thus selected, whereby a polylactic acid, for example, made of either component of L-lactic acid or D-lactic acid in an amount of 85% by mol or more and less than 100% by mol, and a hydroxycarboxylic acid component in an amount exceeding 0% by mol and 15% by mol or less, is obtained. Among them, a polylactic acid obtained by using a lactide, which is a cyclic lactic acid dimer, a glycolide, which is a cyclic glycolic acid dimer, and caprolactone as raw material monomers is preferred. Here, the polylactic acid has an optical purity of preferably 95% or more, and more preferably 98% or more, from the viewpoint of improving heat resistance and transparency of the resin composition. The optical purity of a polylactic acid resin as used herein can be obtained in accordance with the measurement method for D-form content described in "*Poriorefin-toh Gosei-jushi-sei Shokuhin Youki Houso-toh ni Kansuru Jishukijun* (*Self-Standards Concerning Food Containers and Wrappings Made of Synthetic Resins Such as Polyolefins*)," Revised Third Edition, supplemented in June, 2004, Chapter 3 Eisei Shikenho (Hygienic Test Method), p. 12-13." Specifically, the optical purity is measured by a method described in Examples set forth below.

In addition, in the present invention, as the polylactic acid, a stereocomplex polylactic acid, composed of two kinds of polylactic acids, each obtained from a lactic acid component containing an isomer different from one another as a main component, may be used, from the viewpoint of improving heat resistance and transparency of the resin composition.

One polylactic acid constituting the stereocomplex polylactic acid [hereinafter referred to as "polylactic acid (A)"] contains the L-form in an amount of from 90 to 100% by mol, and other component including the D-form in an amount of from 0 to 10% by mol. The other polylactic acid [hereinafter referred to as "polylactic acid (B)"] contains the D-form in an amount of from 90 to 100% by mol, and other component including the L-form in an amount of from 0 to 10% by mol. Other components besides the L-form and the D-form include dicarboxylic acids, polyhydric alcohols, hydroxycarboxylic acids, lactone, and the like, each having a functional group capable of forming two or more ester bonds. Also, other components may be a polyester, a polyether, a polycarbonate, or the like, each having two or more unreacted functional groups mentioned above in one molecule.

The polylactic acid (A) and the polylactic acid (B) in the stereocomplex polylactic acid are in a weight ratio, i.e. polylactic acid (A)/polylactic acid (B), of preferably from 10/90 to 90/10, more preferably from 20/80 to 80/20, and even more preferably from 40/60 to 60/40, from the viewpoint of improving heat resistance and transparency of the resin composition.

The melting point (Tm)(° C.) of the polylactic acid is preferably from 140° to 250° C., more preferably from 150° to 240° C., and even more preferably from 160° to 230° C., from the viewpoint of improving dispersibility of the ester compound or the like in the present invention, and from the viewpoint of improving bending strength of the resin composition, from the viewpoint of reducing its degradation, and from the viewpoint of improving its productivity. Here, the melting point of the resin as used herein is measured in accordance with the method described in Examples set forth below.

It is desired that the polylactic acid is contained in the polylactic acid resin in an amount of preferably 80% by weight or more, more preferably 90% by weight or more, and even more preferably substantially 100% by weight.

In addition, the polylactic acid resin is contained in the resin composition in, but not particularly limited to, an amount of preferably 50% by weight or more, more preferably 60% by weight or more, and even more preferably 70% by weight or more.

Here, the polylactic acid can be synthesized according to the above method, and commercially available products include, for example, "LACEA Series" (manufactured by Mitsui Chemicals, Inc.), such as LACEA H-100, H-280, H-400, and H-440; "Nature Works" (manufactured by Nature Works), such as 3001D, 3051D, 4032D, 4042D, 6201D, 6251D, 7000D, and 7032D; and "Ecoplastic U' z Series" (manufactured by TOYOTA MOTOR CORPORATION), such as Ecoplastic U' z S-09, S-12, and S-17. Among them, LACEA H-100, H-280, H-400, H-440 (manufactured by Mitsui Chemicals, Inc.), 3001D, 3051D, 4032D, 4042D, 6201D, 6251D, 7000D, and 7032D (manufactured by Nature Works), and Ecoplastic U' z S-09, S-12, and S-17 (manufactured by TOYOTA MOTOR CORPORATION) are preferred, from the viewpoint of improving heat resistance of the resin composition.

Also, the resin composition of the present invention may further contain, in addition to the ester compound and the aliphatic polyester mentioned above, additives such as a plasticizer other than the ester compound in the present invention, a crystal nucleating agent, a hydrolysis inhibitor, a filler, e.g. an inorganic filler or an organic filler, a flame retardant, a resin other than the aliphatic polyester, and a compatibilizing agent.

(Plasticizer Other than the Ester Compound in the Present Invention)

In the present invention, the resin composition can contain other plasticizers together with the above ester compound, from the viewpoint of further improving transparency and moldability of the resin composition. The other plasticizers include, but not particularly limited to, an ester compound having two or more ester groups in one molecule, wherein at least one member of the alcohol component constituting the ester compound is an alcohol to which an alkylene oxide having 2 or 3 carbon atoms is added in an amount of from 0.5 to 5 mol on average per one hydroxyl group. Specifically, the plasticizer is exemplified by plasticizers listed in Japanese Patent Laid-Open Nos. 2008-174718 and 2008-115372.

The content of the plasticizer, in other words, a total content of the other plasticizer and the above ester compound, is such that the plasticizer is contained in an amount of preferably from 1 to 50 parts by weight, and more preferably from 5 to 30 parts by weight, based on 100 parts by weight of the aliphatic polyester, from the viewpoint of improving heat resistance, transparency, and moldability of the molded article made of the resin composition.

(Crystal Nucleating Agent)

In the present invention, it is preferable that the resin composition contains a crystal nucleating agent, from the viewpoint of further improving a crystallization velocity of the resin composition of the present invention, and heat resistance and moldability of the molded article made of the resin composition. Accordingly, it is preferable that the resin composition of the present invention contains the ester compound, the aliphatic polyester, and the crystal nucleating agent mentioned above.

The crystal nucleating agent includes amides, such as fatty acid monoamides, fatty acid bisamides, aromatic carboxylic acid amides, and rosin amides; hydroxyfatty acid esters; metal salts such as metal salts of dialkyl esters of aromatic sulfonic acids, metal salts of phenylphosphonic acids, metal salts of phosphoric esters, and metal salts of rosin acids; carbohydrazides; N-substituted ureas; organic pigments, and the like. At least one compound selected from the group consisting of a compound having a hydroxyl group and an amide group in one molecule, and hydroxyfatty acid esters is preferred, and a combined use of at least one of these compounds listed above with a metal salt of a phenylphosphonic acid is more preferred, and a combined use of the compound having a hydroxyl group and an amide group in one molecule and a metal salt of a phenylphosphonic acid is even more preferred, from the viewpoint of satisfying both strength and flexibility, and improving moldability, heat resistance, and impact resistance of the resin composition, and improving anti-blooming property of the crystal nucleating agent.

Specific examples of the compound having a hydroxyl group and an amide group in one molecule include hydroxyfatty acid monoamides such as 12-hydroxystearic acid monoethanolamide; hydroxyfatty acid bisamides, such as methylenebis 12-hydroxystearic amide, ethylenebis 12-hydroxystearic amide, and hexamethylenebis 12-hydroxystearic amide; and the like. Among them, the fatty acid bisamides having two or more hydroxyl groups and two or more amide groups are preferred, from the viewpoint of improving compatibility with the aliphatic polyester and accomplishing satisfaction of both strength and flexibility of the resin composition. Alkylenebis hydroxystearic amides, such as methylenebis 12-hydroxystearic amide, ethylenebis 12-hydroxystearic amide, and hexamethylenebis 12-hydroxystearic amide are more preferred, and ethylenebis 12-hydroxystearic amide is even more preferred, from the viewpoint of improving moldability, heat resistance, and impact resistance of the resin composition, and improving anti-blooming property of the crystal nucleating agent.

The compound having a hydroxyl group and an amide group in one molecule has a melting point of preferably 65° C. or higher, more preferably from 70° to 220° C., and even more preferably from 80° to 190° C., from the viewpoint of improving dispersibility of the crystal nucleating agent upon kneading and improving a crystallization velocity of the resin composition.

In a case where at least one compound selected from the group consisting of the compound having a hydroxyl group and an amide group in one molecule and hydroxyfatty acid esters is used together with a metal salt of a phenylphosphonic acid, the proportion of these compounds is such that at least one compound selected from the group consisting of the compound having a hydroxyl group and an amide group in one molecule and hydroxyfatty acid esters/the metal salt of a phenylphosphonic acid are in a weight ratio of preferably from 20/80 to 80/20, more preferably from 30/70 to 70/30, and even more preferably from 40/60 to 60/40, from the viewpoint of exhibiting the effects of the present invention.

The crystal nucleating agent is contained in an amount of preferably from 0.05 to 5 parts by weight, more preferably from 0.10 to 3 parts by weight, even more preferably from 0.20 to 2 parts by weight, and still even more preferably from 0.20 to 1 part by weight, based on 100 parts by weight of the aliphatic polyester, from the viewpoint of satisfying both strength and flexibility, and obtaining impact resistance of the resin composition. Here, the amount of the crystal nucleating agent contained means a total content of all the crystal nucleating agents blended in the resin composition.

(Hydrolysis Inhibitor)

The resin composition of the present invention can further contain a hydrolysis inhibitor, from the viewpoint of improving durability and hydrolysis resistance. Accordingly, the resin composition of the present invention preferably contains the ester compound, the aliphatic polyester, and the hydrolysis inhibitor mentioned above, and the resin composition more preferably contains the ester compound, the aliphatic polyester, the crystal nucleating agent, and the hydrolysis inhibitor mentioned above. The hydrolysis inhibitor includes carbodiimide compounds such as polycarbodiimide compounds and monocarbodiimide compounds, and the polycarbodiimide compounds are preferred from the viewpoint of improving durability and impact resistance of the resin composition, and the monocarbodiimide compounds are preferred from the viewpoint of improving durability and moldability (fluidity) of the resin composition. It is preferable that the monocarbodiimide compound and the polycarbodiimide compound are used together, from the viewpoint of even more improving durability, impact resistance, and moldability of the molded article made of the resin composition.

The polycarbodiimide compound includes poly(4,4'-diphenylmethanecarbodiimide), poly(4,4'-dicyclohexylmethanecarbodiimide), poly(1,3,5-triisopropylbenzene)polycarbodiimide, poly(1,3,5-triisopropylbenzene and 1,5-diisopropylbenzene)polycarbodiimide, and the like. The monocarbodiimide compound includes N,N'-di-2,6-diisopropylphenylcarbodiimide, and the like.

In order to satisfy durability, impact resistance, and moldability of the molded article made of the resin composition, the above-mentioned carbodiimide compounds may be used alone or in a combination of two or more kinds. In addition, as the poly(4,4'-dicyclohexylmethanecarbodiimide), Carbodilite LA-1 (manufactured by Nisshin Boseki) can be purchased and used; as the poly(1,3,5-triisopropylbenzene)polycarbodiimide and poly(1,3,5-triisopropylbenzene and 1,5-diisopropylbenzene)polycarbodiimide, Stabaxol P and Stabaxol P-100 (manufactured by Rhein Chemie) can be purchased and used; and as N,N'-di-2,6-diisopropylphenylcarbodiimide, Stabaxol I (manufactured by Rhein Chemie) can be purchased and used, respectively.

The hydrolysis inhibitor is contained in an amount of preferably from 0.05 to 3 parts by weight, and more preferably from 0.10 to 2 parts by weight, based on 100 parts by weight of the aliphatic polyester, from the viewpoint of improving transparency and moldability of the molded article made of the resin composition.

(Inorganic Filler)

As the inorganic filler, the filler in the form of fibers, plates, granules, or powders which are ordinarily usable in the reinforcement of a thermoplastic resin can be used. Specific examples include fibrous inorganic fillers such as glass fiber, asbestos fiber, carbon fiber, graphite fiber, metal fiber, potassium titanate whisker, aluminum borate whisker, magnesium-based whisker, silicon-based whisker, wollastonite, sepiolite, asbestos, slag fiber, xonotlite, ellestadite, gypsum fiber, silica fiber, silica alumina fiber, zirconia fiber, boron nitride fiber, silicon nitride fiber, and boron fiber; inorganic fillers in the form of plates or granules, such as glass flake, non-swellable mica, swellable mica, graphite, metal foil, ceramic beads, talc, clay, mica, sericite, zeolite, bentonite, organic modified bentonite, organic modified montmorillonite, dolomite, kaolin, fine silicic acid powder, feldspar powder, potassium titanate, silica balloon, calcium carbonate, magnesium carbonate, barium sulfate, calcium oxide, aluminum oxide, titanium oxide, aluminum silicate, silicon oxide, gypsum, novaculite, dawsonite, and white clay. Among these inorganic fillers, carbon fiber, glass fiber, wollastonite, mica, talc, and kaolin are preferred. In addition, the fibrous filler has an aspect ratio of preferably 5 or more, more preferably 10 or more, and even more preferably 20 or more.

The above-mentioned inorganic filler may be subjected to a coating or binding treatment with a thermoplastic resin such as an ethylene/vinyl acetate copolymer, or with a thermosetting resin such as an epoxy resin, or the inorganic filler may be treated with a coupling agent such as amino silane or epoxy silane.

The inorganic filler is contained in an amount of preferably from 1 to 100 parts by weight, and more preferably from 5 to 50 parts by weight, based on 100 parts by weight of the aliphatic polyester.

(Organic Filler)

As the organic filler, the filler in the form of chips, fibers, plates or powders that are ordinarily usable in reinforcement of a thermoplastic resin can be used. Specific examples thereof include those in the form of chips such as husks, wood chips, bean-curd refuse, wastepaper-crushed material, and clothing crushed material; those in the form of fibers, such as plant fibers such as cotton fiber, flax fiber, bamboo fiber, wood fiber, kenaf fiber, jute fiber, banana fiber, or coconut fiber, or pulps or cellulose fiber processed from these plant fibers, and animal fibers such as silk, wool, Angora, cashmere, or camel; those in the form of powders such as pulp powder, paper powder, wood powder, bamboo powder, cellulose powder, husk powder, fruit shell powder, chitin powder, chitosan powder, protein, or starch. Those in the form of powders such as paper powder, wood powder, bamboo powder, cellulose powder, kenaf powder, husk powder, fruit shell powder, chitin powder, chitosan powder, protein powder, or starch powder are preferred, and paper powder, wood powder, bamboo powder, cellulose powder, and kenaf powder are more preferred, from the viewpoint of moldability. In addition, it is preferable to use an organic filler in the form of a powder in which a cellulose is amorphized with a vibrating rod mill, a beads mill or the like, from the viewpoint of improving toughness.

The organic filler is contained in an amount of preferably from 1 to 100 parts by weight, and more preferably from 5 to 50 parts by weight, based on 100 parts by weight of the aliphatic polyester.

(Flame Retardant)

The flame retardant includes halogen-containing compounds, containing bromine or chlorine, such as tetrabromobisphenol-A-epoxy oligomer, tetrabromobisphenol-A-carbonate oligomer, and brominated epoxy resin; inorganic flame retardants such as antimony trioxide and zinc borate; silicone-based flame retardants such as silicone resins and silicone oil; inorganic hydrates such as aluminum hydroxide and magnesium hydroxide (preferably surface-treated with a silane coupling agent, especially isocyanate silane, from the viewpoint of physical properties); phosphorus-containing compounds such as triarylisopropyl phosphates, condensed phosphoric esters, melamine polyphosphoric acids, piperazine polyphosphoric acids, and phosphazene compounds; and nitrogen-containing compounds such as melamine cyanurate; and the like, and the inorganic hydrate or the phosphorus-containing compound is preferred from the viewpoint of safety, and a combined use of the inorganic hydrate and the phosphorus-containing compound is preferred from the viewpoint of physical properties. The flame retardant is contained in an amount of preferably from 10 to 60 parts by weight, and more preferably from 15 to 50 parts by weight, based on 100 parts by weight of the aliphatic polyester.

(Other Resins and Additives)

The resin composition of the present invention can contain a high-strength organic synthetic fiber, from the viewpoint of improving physical properties such as strength, heat resistance, and impact resistance. Specific examples of the high-strength organic synthetic fiber include aramide fiber, polyarylate fiber, PBO fiber, and the like, and the aramide fiber is preferred, from the viewpoint of improving heat resistance. The high-strength organic synthetic fiber is contained in an amount of preferably from 3 to 20 parts by weight, and more preferably from 5 to 10 parts by weight, based on 100 parts by weight of the aliphatic polyester.

In addition, the resin composition of the present invention may contain other resins, from the viewpoint of improving physical properties such as rigidity, flexibility, heat resistance, and durability. Specific examples of other resins include thermoplastic resins such as polyethylene, polypropylene, polystyrene, ABS resins, AS resins, acrylic resins, polyamides, polyphenylene sulfide, polyether ether ketone, polyesters, polyacetals, polysulfone, polyphenylene oxide, polyimide, polyetherimide, and the like, or flexible thermoplastic resins such as ethylene/glycidyl methacrylate copolymers, polyester elastomers, polyamide elastomers, ethylene/propylene terpolymers, ethylene/buten-1-e copolymers; thermosetting resins such as phenol resins, melamine resins, unsaturated polyester resins, silicone resins, and epoxy resins; and the like. Among them, a resin which has a bond containing a carbonyl group, such as amide bond, an ester bond, or a carbonate bond is preferred, because the resin is likely to have a structurally high affinity with a polylactic acid resin, from the viewpoint of improving compatibility with the aliphatic polyester. Here, in a case where the above resin is contained, a polymer alloy of a blend of the aliphatic polyester resin with the above resin may be also used.

In the present invention, in a case where the resin composition contains the high-strength organic synthetic fiber and the other resins, in addition to the aliphatic polyester resin, in order to increase the compatibility between the resins themselves, the resin composition can preferably contain at least one member selected from the group consisting of the following compatibilizing agents:

a compatibilizing agent (1): an ethylene/vinyl acetate copolymer;

a compatibilizing agent (2): an ethylene/(meth)acrylic ester copolymer;

a compatibilizing agent (3): a polyolefin resin having at least one functional group (substituent) selected from the group consisting of an acid anhydride group, a carboxyl group, an amino group, an imino group, an alkoxysilyl group, a silanol group, a silyl ether group, a hydroxyl group, and an epoxy group;

a compatibilizing agent (4): an acrylic resin or styrenic resin having at least one functional group (substituent) selected from the group consisting of an acid anhydride group, a carboxyl group, an amino group, an imino group, an alkoxysilyl group, a silanol group, a silyl ether group, a hydroxyl group, and an epoxy group;

a compatibilizing agent (5): a polyester resin; and a compatibilizing agent (6): an ionomer resin.

Specifically, "Bondfast 7M, 7B, or 2C" manufactured by SUMITOMO CHEMICAL CO., LTD. (polyethylene resins having an epoxy group); "ARUFON" manufactured by TOAGOSEI CO., LTD. (acrylic resin or styrenic resin having an epoxy group); "Plamate PD-350" manufactured by DIC (PLA-aliphatic polyester copolymer), or the like can be suitably used.

The resin composition of the present invention may contain a core-shell shaped rubber, from the viewpoint of improving physical properties such as impact resistance and toughness. Specific examples thereof include (core: silicone/acrylic polymer, shell: methyl methacrylate polymer), (core: silicone/acrylic polymer, shell: methyl methacrylate/glycidyl methacrylate polymer), (core: butadiene/styrene polymer, shell: methyl methacrylate polymer), (core: acrylic polymer, shell: methyl methacrylate polymer), and the like. As a commercially available product, METABLEN S-2006, S-2100, S-2200, manufactured by Mitsubishi Rayon, PARALOID BPM-500, manufactured by Rohm and Haas are preferred, from the viewpoint of improving transparency. The core-shell shaped rubber is contained in an amount of preferably from 2 to 30 parts by weight, more preferably from 3 to 20 parts by weight, based on 100 parts by weight of the aliphatic polyester.

The resin composition of the present invention can further contain, in addition to those mentioned above, a hindered phenol-based or phosphite-based antioxidant, or a lubricant such as an aliphatic amide, a metal salt of a fatty acid, a hydrocarbon-based wax or an anionic surfactant. Each of the antioxidant or lubricant is contained in an amount of preferably from 0.05 to 3 parts by weight, and more preferably from 0.10 to 2 parts by weight, based on 100 parts by weight of the aliphatic polyester.

In the present invention, the resin composition can further be blended, as raw materials of the composition, with additives such as stabilizers, e.g. ultraviolet absorbents and photostabilizers, mold releasing agents, colorants including dyes and pigments, antistatic agents, anti-clouding agents, mildewproof agents, bactericidal agents, and blowing agents, in addition to the additives mentioned above, within the range that would not impair the accomplishment of the objective of the present invention.

The resin composition of the present invention can be prepared without particular limitation so long as the resin composition contains the aliphatic polyester and the above ester compound. For example, the resin composition can be prepared by melt-kneading raw materials containing the aliphatic polyester and the above ester compound, and further optionally various additives, including, e.g., a crystal nucleating agent, a hydrolysis inhibitor, an inorganic filler, using a known kneader such as a closed kneader, a single-screw or twin-screw extruder, or an open roller-type kneader. Here, it is preferable that the raw material is previously homogeneously mixed with a Henschel mixer, Super mixer, or the like, and then subjected to melt-kneading.

The melt-kneading temperature is equal to or higher than a melting point (Tm) of the aliphatic polyester, preferably a temperature calculated in the range of from Tm to Tm+100° C., and more preferably a temperature calculated in the range of from Tm to Tm+50° C., from the viewpoint of improving dispersibility of the plasticizer, the crystal nucleating agent, and the like. For example, the melt-kneading temperature is preferably from 170° to 240° C., and more preferably from 170° to 220° C. The melt-kneading time cannot be unconditionally determined because it depends on a melt-kneading temperature and a kind of a kneader, and the melt-kneading time is preferably from 15 to 900 seconds. Here, the above ester compound serves to inhibit the generation of the volatile organic compounds even when melt-kneaded at the above temperature.

The melt-kneaded product obtained may be cooled after the melt-kneading, from the viewpoint of even more improving crystallization velocity. A cooling temperature is preferably a temperature that is calculated from a melt-kneading temperature minus 60° C. or more, and more preferably that minus 70° C. or more, and specifically, a cooling temperature is preferably from 20° to 120° C., and more preferably from 20 to 100° C. The cooling time is preferably from 2 to 90 seconds, and more preferably from 5 to 60 seconds. Here, when cooling, the melt-kneaded mixture may be previously molded in accordance with a known method, and then cooled.

Furthermore, after cooling, the cooled product may be kept at a temperature of preferably from 50° to 120° C., and more preferably from 60° to 100° C., and for a period of preferably from 30 to 180 seconds, more preferably from 30 to 120 seconds, and even more preferably from 30 to 60 seconds. Here, the temperature at which the melt-kneaded mixture is kept may be the same or different from the cooling temperature.

Since the resin composition of the present invention thus obtained has favorable processability, and inhibits the generation of the volatile organic compounds, the resin composition can be used at high-temperature conditions, so that the resin composition can be suitably used in various applications, especially automobile applications. Therefore, the present invention also provides a resin molded article formed by molding the resin composition of the present invention.

The resin molded article of the present invention is not particularly limited, so long as the resin composition of the present invention is molded. As the molding method, a known method can be employed. For example, the resin molded article of the present invention is obtained by injection-molding the resin composition of the present invention using an injection molding machine of which cylinder temperature is set at preferably from 180° to 220° C., and more preferably from 180° to 210° C.

The present invention also provides a method for producing a resin composition of the present invention.

The method for production may be any method including the step of melt-kneading the ester compound and the aliphatic polyester mentioned above, and the method is exemplified by the following embodiments depending upon the method for producing the ester compound mentioned above.

For example, an embodiment including producing an ester compound according to a transesterification reaction includes a method including the following steps (Embodiment A):
(step 1-1) carrying out an esterification reaction between (2) the dicarboxylic acid and (1) the monohydric alcohol to synthesize a dicarboxylic acid ester;
(step 1-2) carrying out a transesterification reaction between the dicarboxylic acid ester obtained in the step 1-1 and (3) the dihydric alcohol, to give an ester compound containing a carboxylic acid ester, the ester compound having an acid value of 1.00 mgKOH/g or less, a hydroxyl value of 5.0 mgKOH/g or less, and a number-average molecular weight of from 300 to 700; and
(step 1-3) melt-kneading the ester compound obtained in the step 1-2 and the aliphatic polyester.

Alternatively, an embodiment including producing an ester compound according to a one-time addition reaction of the ester compound includes a method including the following steps (Embodiment B):
(step 2-1) allowing to react (1) the monohydric alcohol, (2) the dicarboxylic acid, and (3) the dihydric alcohol at one time, to give an ester compound containing a carboxylic acid ester, the ester compound having an acid value of 1.00 mgKOH/g or less, a hydroxyl value of 5.0 mgKOH/g or less, and a number-average molecular weight of from 300 to 700; and
(step 2-2) melt-kneading the ester compound obtained in the step 2-1 and the aliphatic polyester.

The steps for obtaining an ester compound in the method of Embodiment A, i.e. the step 1-1 and the step 1-2, can be referred to the method of Embodiment 1 mentioned above as the method for producing an ester compound. More specifically, the step 1-1 of Embodiment A can be referred to the step 1 of Embodiment 1, and the step 1-2 of Embodiment A can be referred to the step 2 of Embodiment 1.

For example, in the step 1-1, (2) the dicarboxylic acid and (1) the monohydric alcohol can be subjected to an esterification reaction, in the same manner as in the step 1 of Embodiment 1, in a molar ratio, i.e. monohydric alcohol/dicarboxylic acid, of preferably from 2/1 to 20/1, and more preferably from 3/1 to 12/1, at a temperature of preferably from 50° to 200° C., and more preferably from 80° to 140° C., optionally in the presence of a catalyst, to synthesize a dicarboxylic acid ester.

In the step 1-2, the dicarboxylic acid ester obtained in the step 1-2 and (3) the dihydric alcohol can be subjected to a transesterification reaction, in the same manner as in the step 2 of Embodiment 1, in a molar ratio, i.e. dicarboxylic acid ester/dihydric alcohol, of preferably from 1.1/1 to 15/1, more preferably from 1.5/1 to 4/1, and even more preferably from 2.0/1 to 4/1, at a temperature of preferably from 50° to 250° C., and more preferably from 60° to 150° C., optionally in the presence of a catalyst.

The steps for obtaining an ester compound in the method of Embodiment B, i.e. the step 2-1, can be referred to the method of Embodiment 2 mentioned above as the method for producing an ester compound.

For example, in the step 2-1, in the same manner as in Embodiment 2, (1) the monohydric alcohol, (2) the dicarboxylic acid, and (3) the dihydric alcohol are allowed to react at one time in a molar ratio, i.e. dicarboxylic acid/monohydric alcohol/dihydric alcohol, of preferably from 1.1/1.1/1 to 15/100/1, more preferably from 1.5/3/1 to 5/30/1, and even more preferably from 2.0/5/1 to 5/20/1, optionally in the presence of a catalyst.

Also, the melt-kneading in Embodiment A and Embodiment B is not particularly limited. For example, in the step 1-3 of Embodiment A and the step 2-2 of Embodiment B, raw materials further optionally containing various additives in addition to the ester compound obtained and the aliphatic polyester can be melt-kneaded by using a known kneader at a temperature of preferably from 170° to 240° C., and more preferably from 170° to 220° C.

The methods of Embodiment A and Embodiment B may further include the step of cooling the melt-kneaded mixture obtained in the melt-kneading step, from the viewpoint of improving crystallization velocity of the resin composition obtained.

EXAMPLES

The following examples further describe and demonstrate embodiments of the present invention. The examples are given solely for the purposes of illustration and are not to be construed as limitations of the present invention. Parts in Examples are parts by weight, unless specified otherwise. Also, "a normal pressure" means 101.3 kPa, and "an ambient temperature" means a temperature of from 15° to 25° C.

[Weight-Average Molecular Weight (Mw) of Polylactic Acid Resin]

The weight-average molecular weight (Mw) is measured in accordance with GPC (gel permeation chromatography), under the following measurement conditions.

<Measurement Conditions>
Column: GMHHR-H+GMHHR-H
Column Temperature: 40° C.
Detector: RI
Eluent: chloroform
Flow Rate: 1.0 mL/min
Sample Concentration: 1 mg/mL
Amount Injected: 0.1 mL
Calculation standard: polystyrene

[Optical Purity of Polylactic Acid]

The optical purity of a polylactic acid is measured in accordance with the measurement method for D-form content described in "*Poriorefin-toh Gosei-jushi-sei Shokuhin Youki Houso-toh ni Kansuru Jishukijun* (*Self-Standards Concerning Food Containers and Wrappings Made of Synthetic Resins Such as Polyolefins*)," Revised Third Edition, supplemented in June, 2004, Chapter 3 Eisei Shikenho (Hygienic Test Method), p. 12-13" under the following measurement conditions. Specifically, sodium hydroxide in methanol is added to an accurately weighed polylactic acid, and a mixture is set in a water bath shaking machine set at 65° C., and allowed to be hydrolyzed until the resinous components are formed into a homogeneous solution. Further, a diluted hydrochloric acid is added to an alkaline solution after hydrolysis is completed to neutralize, and the hydrolyzed solution is diluted to a certain volume with pure water. Thereafter, a given volume of the dilution is separated in a volumetric flask, and the separated solution is diluted with a mobile phase solution for high-performance liquid chromatography (HPLC). The pH of the dilution is adjusted to a range of from 3 to 7, and the dilution in the volumetric flask is quantified, and filtered with a membrane filter (0.45 μm). The resulting prepared solution is quantified for D-lactic acid and L-lactic acid in accordance with HPLC, whereby optical purity of the polylactic acid resin can be obtained.

<Measurement Conditions for HPLC>
Column: Optically Resolution Column
SUMICHIRAL OA6100 (46 mmφ×150 mm, 5 μm), manufactured by Sumika Chemical Analysis Service, Ltd.
Pre-Column: Optically Resolution Column
SUMICHIRAL QA6100 (4 mmφ×10 mm, 5 μm), manufactured by Sumika Chemical Analysis Service, Ltd.
Column Temperature: 25° C.
Mobile Phase: 2.5% Methanol-containing 1.5 mM aqueous copper sulfate solution
Flow Rate of Mobile Phase: 1.0 mL/minute
Detector: Ultraviolet Detector (UV 254 nm)
Amount of Injection: 20 μL

[Melting Points of Polylactic Acid Resins]

The melting points of the polylactic resins are obtained from an endothermic peak temperature of melt crystallization according to a heating method for measuring differential scanning calorimetry as prescribed in JIS-K7121 (DSC; Diamond DSC, manufactured by Perkin-Elmer). The melting point is measured by heating from 20° to 250° C. at a heating rate of 10° C./minute.

[Acid Value, Hydroxyl Value, and Saponification Value of Ester Compound and Plasticizer]

Acid Value: The analysis is carried out in accordance with a test method as prescribed in JIS K 0070, except that toluene/ethanol=2/1 (volume ratio) is used as a titration solvent.

Hydroxyl Value: The analysis is carried out in accordance with a test method as prescribed in JIS K 0070, except that acetic acid anhydride/pyridine=1/4 (volume ratio) is used as an acetylation solvent, and that the amount is changed to 3 mL.

Saponification Value: The analysis is carried out in accordance with a test method as prescribed in JIS K 0070, except that the temperature of the water bath is changed to 95° C., and that the heating temperature is changed to one hour.

[Molecular Weight, Terminal Alkyl Esterification Percentage, and Ether Group Value of Ester Compound and Plasticizer]

Molecular Weight: The molecular weight of the ester compound or the plasticizer as used herein means a number-average molecular weight, which is calculated according to the following formulas from an acid value, a hydroxyl value, and a saponification value:

$$\text{Average Molecular weight } M = (M_1 + M_2 - M_3 \times 2) \times n + M_1 - (M_3 - 17.01) \times 2 + (M_3 - 17.01) \times p + (M_2 - 17.01) \times q + 1.01 \times (2 - p - q)$$

$$q = \text{Hydroxyl Value} \times M \div 56110$$

$$2 - p - q = \text{Acid Value} \times M \div 56110$$

Average Degree of Polymerization n=Saponification $$\text{Value} \times M \div (2 \times 56110) - 1$$

Terminal Alkyl Esterification Percentage: The alkyl esterification percentage of the molecular terminals, i.e. the terminal alkyl esterification percentage, can be calculated by the following formula. The larger the numerical value of the alkyl esterification percentage of the molecular terminals, the small the number of free carboxyl groups and free hydroxyl groups, showing that the molecular terminals are sufficiently subjected to alkyl esterification.

$$\text{Terminal Alkyl Esterification Percentage } (\%) = (p \div 2) \times 100$$

In the above formulas, $M_1$: a molecular weight of a dibasic acid ester;
$M_2$: a molecular weight of a dihydric alcohol;
$M_3$: a molecular weight of a monohydric alcohol;
p: the number of terminal alkyl ester groups in one molecule; and
q: the number of terminal hydroxyl groups in one molecule.

Ether Group Value: The ether group value is calculated in units of the number of mmol of the ether groups in one gram of an ester compound or a plasticizer, in accordance with the following formula.

$$\text{Ether Group Value } (\text{mmol/g}) = (m - 1) \times n \times 1000 \div M$$

wherein m is an average number of repeats of oxyalkylene groups, i.e. m−1 stands for the number of ether groups in one molecule of the dihydric alcohol.

Production Example 1 of Ester Compound

A four-necked flask (equipped with a stirrer, a thermometer, a dropping funnel, a distillation tube, and a nitrogen gas inlet tube) was charged with 999 g (9.41 mol) of diethylene glycol and 23.6 g of a methanol solution containing 28% by weight of sodium methoxide (sodium methoxide: 0.122 mol) as a catalyst, and methanol was distilled off, while stirring the contents at a normal pressure (101.3 kPa) and 120° C. for 0.5 hours. Thereafter, 4125 g (28.2 mol) of dimethyl succinate (manufactured by Wako Pure Chemical Industries, Ltd.) was added dropwise thereto over 3 hours, and methanol formed by the reaction was distilled off at a normal pressure and 120° C. Next, the residue was cooled to 75° C., and the pressure was gradually dropped from a normal pressure to 6.7 kPa over 2 hours to distill off methanol. Thereafter, the pressure was recovered to a normal pressure, and further 4.4 g of a methanol solution containing 28% by weight sodium methoxide (sodium methoxide: 0.023 mol) was added as a catalyst. The pressure was gradually dropped at 100° C. from a normal pressure to 2.9 kPa over 2 hours to distill off methanol. Thereafter, the residue was cooled to 80° C., 41 g of KYOWAAD 600S (manufactured by Kyowa Chemical Industry Co., Ltd.) was added thereto, and the mixture was stirred at a pressure of 4.0 kPa and 80° C. for 1 hour, and then filtered in vacuo. The filtrate was heated to a temperature of from 70° to 190° C. over 4 hours at a pressure of 0.3 kPa to distill off the residual dimethyl succinate, to provide a yellow liquid (ester compound A) at an ambient temperature. The amount of the catalyst used was 0.51 mol per 100 mol of the dicarboxylic acid ester.

Production Example 2 of Ester Compound

A four-necked flask (equipped with a stirrer, a thermometer, a dropping funnel, and a distillation tube) was charged with 334 g (2.83 mol) of succinic acid, 100 g (0.94 mol) of diethylene glycol, and 242 g (7.55 mol) of methanol, and 6.8 g (0.036 mol) of paratoluenesulfonic acid monohydrate, and the contents were heated from 72° to 140° C. over one hour, to remove distilled components. The procedures of cooling the reaction mixture obtained to 60° C., adding 242 g (7.55 mol) of methanol thereto, and removing distilled components were repeated three times, and thereafter 7.8 g of distilled components were removed at a pressure of 2.7 kPa and 103° C. Next, 16 g of KYOWAAD 500SH (manufactured by Kyowa Chemical Industry Co., Ltd.) was added thereto, and the mixture was stirred at a pressure of 2.5 kPa and 80° C. for 1 hour, and then filtered in vacuo. The filtrate was heated to a temperature of from 66° to 190° C. over 0.5 hours at a pressure of 0.3 kPa to distill off the residual dimethyl succinate, to provide a pale yellow liquid (ester compound B) at an ambient temperature. The amount of the catalyst used was 1.27 mol per 100 mol of the dicarboxylic acid.

Production Example 3 of Ester Compound

A four-necked flask (equipped with a stirrer, a thermometer, a dropping funnel, a distillation tube, and a nitrogen gas inlet tube) was charged with 363 g (3.42 mol) of diethylene glycol and 6.6 g of a methanol solution containing 28% by weight of sodium methoxide (sodium methoxide: 0.034 mol) as a catalyst, and methanol was distilled off, while stirring the contents at a normal pressure and 120° C. for 0.5 hours. Thereafter, 1000 g (6.84 mol) of dimethyl succinate (manufactured by Wako Pure Chemical Industries, Ltd.) was added dropwise thereto over 3 hours, and methanol formed by the reaction was distilled off at a normal pressure and 120° C. Next, the residue was cooled to 75° C., and the pressure was gradually dropped from a normal pressure to 6.7 kPa over 1.5 hours to distill off methanol. Thereafter, the pressure was recovered to a normal pressure, and further 5.8 g of a methanol solution containing 28% by weight sodium methoxide (sodium methoxide: 0.030 mol) was added as a catalyst. The pressure was gradually dropped at 100° C. from a normal pressure to 2.9 kPa over 2 hours to distill off methanol. Thereafter, the residue was cooled to 80° C., 18 g of KYOWAAD 600S (manufactured by Kyowa Chemical Industry Co., Ltd.) was added thereto, and the mixture was stirred at a pressure of 4.0 kPa and 80° C. for 1 hour, and then filtered in vacuo. The filtrate was heated to a temperature of from 70° to 190° C. over 1 hour at a pressure of 0.3 kPa to distill off the residual dimethyl succinate, to provide a yellow liquid (ester compound C) at an ambient temperature. The amount of the catalyst used was 0.94 mol per 100 mol of the dicarboxylic acid ester.

Production Example 4 of Ester Compound

A four-necked flask (equipped with a stirrer, a thermometer, a dropping funnel, a distillation tube, and a nitrogen gas inlet tube) was charged with 342 g (2.28 mol) of triethylene glycol and 4.4 g of a methanol solution containing 28% by weight of sodium methoxide (sodium methoxide: 0.023 mol) as a catalyst, and methanol was distilled off, while stirring the contents at a normal pressure and 120° C. for 0.5 hours. Thereafter, 1000 g (6.84 mol) of dimethyl succinate (manufactured by Wako Pure Chemical Industries, Ltd.) was added dropwise thereto over 3 hours, and methanol formed by the reaction was distilled off at a normal pressure and 120° C. Next, the residue was cooled to 75° C., and the pressure was gradually dropped from a normal pressure to 6.7 kPa over 2 hours to distill off methanol. Thereafter, the pressure was recovered to a normal pressure, and further 3.8 g of a methanol solution containing 28% by weight sodium methoxide (sodium methoxide: 0.020 mol) was added as a catalyst. The pressure was gradually dropped at 100° C. from a normal pressure to 2.9 kPa over 3 hours to distill off methanol. Thereafter, the residue was cooled to 80° C., 12 g of KYOWAAD 600S (manufactured by Kyowa Chemical Industry Co., Ltd.) was added thereto, and the mixture was stirred at a pressure of 4.0 kPa and 80° C. for 1 hour, and then filtered in vacuo. The filtrate was heated to a temperature of from 70° to 165° C. over 1 hour at a pressure of 0.3 kPa to distill off the residual dimethyl succinate, to provide a yellow liquid (ester compound D) at an ambient temperature. The amount of the catalyst used was 0.63 mol per 100 mol of the dicarboxylic acid ester.

Production Example 5 of Ester Compound

A four-necked flask (equipped with a stirrer, a thermometer, a dropping funnel, a distillation tube, and a nitrogen gas inlet tube) was charged with 86.8 g (1.14 mol) of 1,3-propanediol and 2.2 g of a methanol solution containing 28% by weight of sodium methoxide (sodium methoxide: 0.011 mol) as a catalyst, and methanol was distilled off, while stirring the contents at a normal pressure and 120° C. for 0.5 hours. Thereafter, 500 g (3.42 mol) of dimethyl succinate (manufactured by Wako Pure Chemical Industries, Ltd.) was added dropwise thereto over 2 hours, and methanol formed by the reaction was distilled off at a normal pressure and 120° C. Next, the residue was cooled to 75° C., and the pressure was gradually dropped from a normal pressure to 6.7 kPa over 2 hours to distill off methanol. Thereafter, the pressure was recovered to a normal pressure, and further 2.0 g of a methanol solution containing 28% by weight sodium methoxide (sodium methoxide: 0.010 mol) was added as a catalyst. The pressure was gradually dropped at 100° C. from a normal pressure to 2.9 kPa over 3 hours to distill off methanol. Thereafter, the residue was cooled to 80° C., 6 g of KYOWAAD 600S (manufactured by Kyowa Chemical Industry Co., Ltd.) was added thereto, and the mixture was stirred at a pressure of 4.0 kPa and 80° C. for 1 hour, and then filtered in vacuo. The filtrate was heated to a temperature of from 114° to 194° C.

over 1 hour at a pressure of 4.5 kPa to distill off the residual dimethyl succinate, to provide a yellow liquid (ester compound E) at an ambient temperature. The amount of the catalyst used was 0.61 mol per 100 mol of the dicarboxylic acid ester.

Production Example 6 of Ester Compound

A four-necked flask (equipped with a stirrer, a thermometer, a dropping funnel, a distillation tube, and a nitrogen gas inlet tube) was charged with 260 g (3.42 mol) of 1,2-propanediol and 4.2 g of a methanol solution containing 28% by weight of sodium methoxide (sodium methoxide: 0.022 mol) as a catalyst, and methanol was distilled off, while stirring the contents at a normal pressure and 120° C. for 0.5 hours. Thereafter, 1500 g (10.26 mol) of dimethyl succinate (manufactured by Wako Pure Chemical Industries, Ltd.) was added dropwise thereto over 1 hour, and methanol formed by the reaction was distilled off at a normal pressure and 120° C. Next, the residue was cooled to 75° C., and the pressure was gradually dropped from a normal pressure to 6.7 kPa over 2 hours to distill off methanol. Thereafter, the pressure was recovered to a normal pressure, and further 3.7 g of a methanol solution containing 28% by weight sodium methoxide (sodium methoxide: 0.019 mol) was added as a catalyst. The pressure was gradually dropped at 115° C. from a normal pressure to 5.1 kPa over 2 hours to distill off methanol. Thereafter, the residue was cooled to 80° C., 6 g of KYOWAAD 600S (manufactured by Kyowa Chemical Industry Co., Ltd.) was added thereto, and the mixture was stirred at a pressure of 4.0 kPa and 80° C. for 1 hour, and then filtered in vacuo. The filtrate was heated to a temperature of from 95° to 133° C. over 2 hours at a pressure of 0.8 kPa to distill off the residual dimethyl succinate, to provide a yellow liquid (ester compound F) at an ambient temperature. The amount of the catalyst used was 0.40 mol per 100 mol of the dicarboxylic acid ester.

Production Example 7 of Ester Compound

A four-necked flask (equipped with a stirrer, a thermometer, a dropping funnel, a distillation tube, and a nitrogen gas inlet tube) was charged with 203 g (1.91 mol) of diethylene glycol and 5.5 g of a methanol solution containing 28% by weight of sodium methoxide (sodium methoxide: 0.029 mol) as a catalyst, and methanol was distilled off, while stirring the contents at a normal pressure and 120° C. for 0.5 hours. Thereafter, 1000 g (5.74 mol) of dimethyl adipate (manufactured by Wako Pure Chemical Industries, Ltd.) was added dropwise thereto over 2 hours, and methanol formed by the reaction was distilled off at a normal pressure and 120° C. Next, the residue was cooled to 75° C., and the pressure was gradually dropped from a normal pressure to 6.7 kPa over 2 hours to distill off methanol. Thereafter, the pressure was recovered to a normal pressure, and further 3.7 g of a methanol solution containing 28% by weight sodium methoxide (sodium methoxide: 0.019 mol) was added as a catalyst. The pressure was gradually dropped at 100° C. from a normal pressure to 2.4 kPa over 2 hours to distill off methanol. Thereafter, the residue was cooled to 80° C., 14 g of KYOWAAD 600S (manufactured by Kyowa Chemical Industry Co., Ltd.) was added thereto, and the mixture was stirred at a pressure of 4.0 kPa and 80° C. for 1 hour, and then filtered in vacuo. The filtrate was heated to a temperature of from 70° to 190° C. over 1 hour at a pressure of 0.3 kPa to distill off the residual dimethyl adipate, to provide a yellow liquid (ester compound G) at an ambient temperature. The amount of the catalyst used was 0.84 mol per 100 mol of the dicarboxylic acid ester.

Production Example 8 of Ester Compound

A four-necked flask (equipped with a stirrer, a thermometer, a dropping funnel, a distillation tube, and a nitrogen gas inlet tube) was charged with 263.5 g (2.53 mol) of neopentyl glycol, 1500 g (4.05 mol) of bis(2-ethylhexyl) adipate, and 5.6 g of a methanol solution containing 28% by weight of sodium methoxide (sodium methoxide: 0.029 mol) as a catalyst, and 2-ethylhexanol formed by the reaction was distilled off, while allowing the contents to react at a pressure of 3.7 kPa and 120° C. for 1.5 hours. Next, the residue was cooled to 75° C., and the pressure was thereafter recovered to a normal pressure, and further 3.0 g of a methanol solution containing 28% by weight sodium methoxide (sodium methoxide: 0.016 mol) was added as a catalyst. The temperature was raised from 92° to 160° C. at a pressure of 0.4 kPa over 1 hour to distill off 2-ethylhexanol. Thereafter, the residue was cooled to 80° C., 19 g of KYOWAAD 600S (manufactured by Kyowa Chemical Industry Co., Ltd.) was added thereto, and the mixture was stirred at a pressure of 4.0 kPa and 80° C. for 1 hour, and then filtered in vacuo. The filtrate was heated to a temperature of from 166° to 214° C. over 2 hours at a pressure of 0.3 kPa to distill off 504 g of the residual bis(2-ethylhexyl) adipate, to provide a yellow liquid (ester compound H) at an ambient temperature. The amount of the catalyst used was 1.11 mol per 100 mol of the dicarboxylic acid ester.

Production Example 9 of Ester Compound

A four-necked flask (equipped with a stirrer, a thermometer, a Dean-Stark apparatus, and a nitrogen gas inlet tube) was charged with 2515 g (19.3 mol) of 2-ethylhexanol (manufactured by KANTO CHEMICAL CO., LTD.), 877 g (7.43 mol) of succinic acid (manufactured by Wako Pure Chemical Industries, Ltd.), and 14.1 g (0.0742 mol) of paratoluenesulfonic acid monohydrate (manufactured by Wako Pure Chemical Industries, Ltd.), and the contents were allowed to react from a state of a pressure of 16 kPa and 80° C. to a state of a pressure of 12 kPa and 90° C. over 7 hours to distill off water. Thereafter, 32 g of KYOWAAD 500SH (manufactured by Kyowa Chemical Industry Co., Ltd.) was added thereto, and the mixture was stirred at a pressure of 4.0 kPa and 80° C. for 1 hour, and then filtered in vacuo. A four-neck flask (equipped with a stirrer, a thermometer, a distillation tube, and a nitrogen gas inlet tube) was charged with the filtrate, and the residual 2-ethylhexanol was distilled off by allowing the contents to react from a state of a pressure of 0.7 kPa and 95° C. to a state of a pressure 0.5 kPa and 185° C. Thereafter, 16 g of KYOWAAD 500SH was again added thereto, and the mixture was stirred at a pressure of 4.0 kPa and 80° C. for 1 hour, and then filtered in vacuo, to provide bis(2-ethylhexyl) succinate. Next, a four-necked flask (equipped with a stirrer, a thermometer, a dropping funnel, a distillation tube, and a nitrogen gas inlet tube) was charged with 467 g (1.36 mol) of the bis(2-ethylhexyl) succinate obtained, 250 g (2.36 mol) of diethylene glycol, and 2.2 g of a methanol solution containing 28% by weight of sodium methoxide (sodium methoxide: 0.011 mol) as a catalyst, and 2-ethylhexanol formed by the reaction was distilled off by allowing the contents to react at 110° C. while gradually dropping the pressure from 2.7 kPa to 0.9 kPa over 45 minutes. The residue was cooled to 80° C., thereafter 1953 g (5.70 mol) of bis(2-ethylhexyl) succinate and 5.0 g of a methanol solution containing 28% by weight of sodium methoxide (sodium methoxide: 0.026 mol) were again added thereto, and the pressure was gradually dropped while increasing the temperature, from a state of 110° C. and 0.8 kPa to a state of 158° C. and 0.4 kPa over 5.5 hours, to distill off 2-ethylhexanol formed by the reaction. The residue was then cooled to 80° C., and 10.5 g of KYOWAAD 600S (manufactured by Kyowa Chemical Industry Co., Ltd.) was added thereto, and the mixture was stirred at a pressure of 4.0 kPa and 80° C. for 1 hour, and then filtered in vacuo. The residual bis(2-ethylhexyl) succinate was distilled off from the filtrate by gradually dropping the pressure while increasing the temperature, from a state of 178° C. and 0.3 kPa to a state of 220° C. and 0.1 kPa over 4.5 hours, to provide a yellow liquid (ester compound I) at an ambient temperature. The amount of the catalyst used was 0.53 mol per 100 mol of the dicarboxylic acid ester.

Production Example 10 of Ester Compound

A four-necked flask (equipped with a stirrer, a thermometer, a Dean-Stark apparatus, and a nitrogen gas inlet tube) was charged with 1700 g (22.9 mol) of 1-butanol (manufactured by Wako Pure Chemical Industries, Ltd.), 1042 g (8.82 mol) of succinic acid (manufactured by Wako Pure Chemical Industries, Ltd.), and 16.8 g (0.0882 mol) of paratoluenesulfonic acid monohydrate (manufactured by Wako Pure Chemical Industries, Ltd.), and the pressure was gradually dropped at 74° C. from 15.2 kPa to 6.9 kPa over 6.5 hours to distill off water. Thereafter, 28 g of KYOWAAD 500SH (manufactured by Kyowa Chemical Industry Co., Ltd.) was added thereto, and the mixture was stirred at a pressure of 4.0 kPa and 80° C. for 1 hour, and then filtered in vacuo. A four-neck flask (equipped with a stirrer, a thermometer, a distillation tube, and a nitrogen gas inlet tube) was charged with the filtrate, and the residual 1-butanol was distilled off by allowing the contents to react from a state of a pressure of 4.9 kPa and 75° C. to a state of a pressure of 2.7 kPa and 159° C. over 1 hour, and thereafter the residue was subjected to distillation at a pressure of 4.0 kPa while raising the temperature from 159° to 162° C., to provide dibutyl succinate. On the other hand, a four-necked flask (equipped with a stirrer, a thermometer, a distillation tube, and a nitrogen gas inlet tube) was charged with 461 g (4.34 mol) of diethylene glycol and 9.8 g of a methanol solution containing 28% by weight of sodium methoxide (sodium methoxide: 0.051 mol) as a catalyst, and methanol was distilled off, while stirring the contents at a pressure of 3.6 kPa and 84° C. for 0.5 hours. Thereafter, 3000 g (13.0 mol) of the dibutyl succinate mentioned above was added dropwise thereto over 3 hours at a pressure of 2.7 kPa and 90° C., and 1-butanol formed by the reaction was distilled off. Next, the temperature was raised to 130° C., and the pressure was gradually dropped from a normal pressure to 0.4 kPa over 1 hour to distill off 1-butanol. Thereafter, the pressure was recovered to a normal pressure, and further 2.5 g of a methanol solution containing 28% by weight sodium methoxide (sodium methoxide: 0.013 mol) was added as a catalyst. The pressure was gradually dropped at 130° C. from 2.7 kPa to 0.4 kPa over 1 hour to distill off 1-butanol. Thereafter, the residue was cooled to 80° C., 18 g of KYOWAAD 600S (manufactured by Kyowa Chemical Industry Co., Ltd.) was added thereto, and the mixture was stirred at a pressure of 4.0 kPa and 80° C. for 1 hour, and then filtered in vacuo. The filtrate was heated to a temperature of from 112° to 180° C. over 2 hours at a pressure of 0.3 kPa to distill off the residual dibutyl succinate, to provide a yellow liquid (ester compound J) at an ambient temperature. The amount of the catalyst used was 0.49 mol per 100 mol of the dicarboxylic acid ester.

Production Example 11 of Ester Compound

A four-necked flask (equipped with a stirrer, a thermometer, a distillation tube, and a nitrogen gas inlet tube) was charged with 369 g (3.47 mol) of diethylene glycol and 5.6 g of a methanol solution containing 28% by weight of sodium methoxide (sodium methoxide: 0.029 mol) as a catalyst, and methanol was distilled off, while stirring the contents at a pressure of 3.6 kPa and 84° C. for 0.5 hours. Thereafter, 1600 g (6.95 mol) of dibutyl succinate obtained in the same manner as in Production Example 10 was added dropwise thereto at a pressure of 2.7 kPa and 79° C. over 2.5 hours, and 1-butanol formed by the reaction was distilled off. Next, the pressure was recovered to a normal pressure, and further 2.1 g of a methanol solution containing 28% by weight sodium methoxide (sodium methoxide: 0.011 mol) was added as a catalyst. Gradually, the temperature was raised and the pressure was dropped, from a state of 85° C. and 2.1 kPa to a state of 146° C. and 1.1 kPa over 1.5 hours to distill off 1-butanol formed by the reaction. Thereafter, the residue was cooled to 80° C., 11 g of KYOWAAD 600S (manufactured by Kyowa Chemical Industry Co., Ltd.) was added thereto, and the mixture was stirred at a pressure of 4.0 kPa and 80° C. for 1 hour, and then filtered in vacuo, to provide a yellow liquid (ester compound K) at an ambient temperature. The amount of the catalyst used was 0.58 mol per 100 mol of the dicarboxylic acid ester.

Production Example 12 of Ester Compound

A four-necked flask (equipped with a stirrer, a thermometer, a dropping funnel, a distillation tube, and a nitrogen gas inlet tube) was charged with 665 g (3.42 mol) of tetraethylene glycol, 1000 g (6.84 mol) of dimethyl succinate (manufactured by Wako Pure Chemical Industries, Ltd.), and 7.0 g of a methanol solution containing 28% by weight of sodium methoxide (sodium methoxide: 0.036 mol) as a catalyst, and methanol was distilled off, while dropping the pressure and raising the temperature from a state of a normal pressure and 29° C. to a state of 16 kPa and 94° C. over 1 hour. Further, 500 g (3.42 mol) of dimethyl succinate was added thereto, and methanol was distilled off at 5 kPa and 90° C. for 15 minutes. Thereafter, 4.0 g of a methanol solution containing 28% by weight sodium methoxide (sodium methoxide: 0.021 mol) was added as a catalyst. Methanol was distilled off while dropping pressure and increasing temperature, from a state of 10 kPa and 79° C. to a state of 2 kPa and 85° C. over 2 hours. Thereafter, 16 g of KYOWAAD 600S (manufactured by Kyowa Chemical Industry Co., Ltd.) was added to the residue, and the mixture was stirred at a pressure of 4.0 kPa and 80° C. for 1 hour, and then filtered in vacuo. The filtrate was heated to a temperature of from 85° to 198° C. over 2 hours at a pressure of 0.53 kPa to distill off the residual dimethyl succinate, to provide a yellow liquid (ester compound L) at an ambient temperature. The amount of the catalyst used was 0.55 mol per 100 mol of the dicarboxylic acid ester.

Production Example 13 of Ester Compound

A four-necked flask (equipped with a stirrer, a thermometer, a dropping funnel, a distillation tube, and a nitrogen gas inlet tube) was charged with 308 g (3.42 mol) of 1,4-butanediol and 7.2 g of a methanol solution containing 28% by weight of sodium methoxide (sodium methoxide: 0.037 mol) as a catalyst, and methanol was distilled off, while stirring the contents at a normal pressure (101.3 kPa) and 120° C. for 0.5 hours. Thereafter, 1500 g (10.26 mol) of dimethyl succinate (manufactured by Wako Pure Chemical Industries, Ltd.) was added dropwise thereto over 3 hours, and methanol formed by the reaction was distilled off at a normal pressure and 120° C. Next, the residue was cooled to 75° C., and the pressure was gradually dropped from a normal pressure to 6.7 kPa over 2 hours to distill off methanol. Thereafter, the pressure was recovered to a normal pressure, and further 2.5 g of a methanol solution containing 28% by weight sodium methoxide (sodium methoxide: 0.013 mol) was added as a catalyst. The pressure was gradually dropped at 100° C. from a normal pressure to 2.9 kPa over 2 hours to distill off methanol. Thereafter, 14 g of KYOWAAD 600S (manufactured by Kyowa Chemical Industry Co., Ltd.) was added to the residue, and the mixture was stirred at a pressure of 4.0 kPa and 90° C. for 1 hour, and then filtered in vacuo. The filtrate was heated to a temperature of from 85° to 180° C. over 2 hours at a pressure of 0.53 kPa to distill off the residual dimethyl succinate, to provide a yellow-white liquid (ester compound M) at an ambient temperature. The amount of the catalyst used was 0.49 mol per 100 mol of the dicarboxylic acid ester.

Production Example 14 of Ester Compound

A four-necked flask (equipped with a stirrer, a thermometer, a dropping funnel, a distillation tube, and a nitrogen gas inlet tube) was charged with 521 g (6.84 mol) of 1,3-propanediol and 5.9 g of a methanol solution containing 28% by weight of sodium methoxide (sodium methoxide: 0.031 mol) as a catalyst, and methanol was distilled off, while stirring the contents at a normal pressure and 120° C. for 0.5 hours. Thereafter, 1500 g (10.26 mol) of dimethyl succinate (manufactured by Wako Pure Chemical Industries, Ltd.) was added dropwise thereto over 1 hour, and methanol formed by the reaction was distilled off at a normal pressure and 120° C. Next, the residue was cooled to 60° C., and 5.6 g of a methanol solution containing 28% by weight sodium methoxide (sodium methoxide: 0.029 mol) was added thereto. The temperature was raised to 120° C. over 2 hours, and the pressure was then gradually dropped from a normal pressure to 3.7 kPa over 1 hour to distill off methanol. Thereafter, the residue was cooled to 80° C., 18 g of KYOWAAD 600S (manufactured by Kyowa Chemical Industry Co., Ltd.) was added thereto, and the mixture was stirred at a pressure of 4.0 kPa and 80° C. for 1 hour, and then filtered in vacuo. The filtrate was heated to a temperature of from 85° to 194° C. over 2.5 hours at a pressure of 0.1 kPa to distill off the residual dimethyl succinate, to provide a yellow liquid (ester compound N) at an ambient temperature. The amount of the catalyst used was 0.58 mol per 100 mol of the dicarboxylic acid ester.

The acid value, the hydroxyl value, and the saponification value of the resulting compounds were measured, and the number-average molecular weight, the terminal alkyl esterification percentage, the average degree of polymerization (n), and the ether group value were calculated based on the above formulas. The results are shown in Tables 1 and 2.

TABLE 1

| | Production Method | Raw Materials (Molar Ratio) | $R^1$ | $R^2$ | $R^3$ | m | n |
|---|---|---|---|---|---|---|---|
| Ester Compound A | Embodiment 1 | Dimethyl Succinate/Diethylene Glycol (3.0/1) | Methyl | Ethylene | Ethylene | 2 | 1.6 |
| Ester Compound B | Embodiment 2 | Succinic Acid/Methanol/Diethylene Glycol (3.0/8.0/1) | Methyl | Ethylene | Ethylene | 2 | 1.7 |
| Ester Compound C | Embodiment 1 | Dimethyl Succinate/Diethylene Glycol (2.0/1) | Methyl | Ethylene | Ethylene | 2 | 2.1 |
| Ester Compound D | Embodiment 1 | Dimethyl Succinate/Triethylene Glycol (3.0/1) | Methyl | Ethylene | Ethylene | 3 | 1.5 |
| Ester Compound E | Embodiment 1 | Dimethyl Succinate/1,3-Propanediol (3.0/1) | Methyl | Ethylene | 1,3-Propylene | 1 | 1.5 |
| Ester Compound F | Embodiment 1 | Dimethyl Succinate/1,2-Propanediol (3.0/1) | Methyl | Ethylene | 1,2-Propylene | 1 | 1.6 |
| Ester Compound G | Embodiment 1 | Dimethyl Adipate/Diethylene Glycol (3.0/1) | Methyl | 1,4-Butylene | Ethylene | 2 | 1.5 |
| Ester Compound H | Embodiment 1 | Bis(2-ethylhexyl) Adipate/Neopentyl Glycol (1.6/1) | 2-Ethylhexyl | 1,4-Butylene | 2,2-Dimethyl-1,3-propylene | 1 | 1.2 |

| | Acid Value (mgKOH/g) | Hydroxyl Value (mgKOH/g) | Saponification Value (mgKOH/g) | Number-Average Molecular Weight | Terminal Alkyl Esterification Percentage (%) | Ether Group Value (mmol/g) |
|---|---|---|---|---|---|---|
| Ester Compound A | 0.48 | 1.1 | 650.7 | 450 | 99.4 | 3.6 |
| Ester Compound B | 0.67 | 1.7 | 649.4 | 460 | 99.0 | 3.6 |
| Ester Compound C | 0.37 | 0.6 | 643.2 | 530 | 99.5 | 3.9 |
| Ester Compound D | 0.58 | 0.5 | 567.2 | 490 | 99.5 | 6.0 |
| Ester Compound E | 1.00 | 0.5 | 731.7 | 380 | 99.5 | 0 |
| Ester Compound F | 0.47 | 4.8 | 728.1 | 400 | 98.1 | 0 |
| Ester Compound G | 0.87 | 3.1 | 562.1 | 490 | 98.3 | 3.0 |
| Ester Compound H | 0.72 | 12.8 | 394.6 | 610 | 92.6 | 0 |

TABLE 2

|  | Production Method | Raw Materials (Molar Ratio) | $R^1$ | $R^2$ | $R^3$ | m | n |
|---|---|---|---|---|---|---|---|
| Ester Compound I | Embodiment 1 | Bis(2-ethylhexyl Succinate/Diethylene Glycol (3.0/1) | 2-Ethylhexyl | Ethylene | Ethylene | 2 | 1.4 |
| Ester Compound J | Embodiment 1 | Dibutyl Succinate/Diethylene Glycol (3.0/1) | Butyl | Ethylene | Ethylene | 2 | 1.4 |
| Ester Compound K | Embodiment 1 | Dibutyl Succinate/Diethylene Glycol (2.0/1) | Butyl | Ethylene | Ethylene | 2 | 1.9 |
| Ester Compound L | Embodiment 1 | Dimethyl Succinate/Tetraethylene Glycol (3.0/1) | Methyl | Ethylene | Ethylene | 2 | 1.5 |
| Ester Compound M | Embodiment 1 | Dimethyl Succinate/1,4-Butanediol (3.0/1) | Methyl | Ethylene | 1,4-Butylene | 1 | 1.4 |
| Ester Compound N | Embodiment 1 | Dimethyl Succinate/1,3-Propanediol (1.5/1) | Methyl | Ethylene | 1,3-Propylene | 1 | 4.4 |

|  | Acid Value (mgKOH/g) | Hydroxyl Value (mgKOH/g) | Saponification Value (mgKOH/g) | Number-Average Molecular Weight | Terminal Alkyl Esterification Percentage (%) | Ether Group Value (mmol/g) |
|---|---|---|---|---|---|---|
| Ester Compound I | 0.06 | 0.7 | 443.9 | 600 | 99.6 | 2.3 |
| Ester Compound J | 0.20 | 3.0 | 544.0 | 490 | 98.6 | 2.9 |
| Ester Compound K | 0.23 | 2.4 | 552.7 | 590 | 98.6 | 3.2 |
| Ester Compound L | 0.56 | 1.8 | 498.7 | 560 | 98.8 | 8.0 |
| Ester Compound M | 0.69 | 1.3 | 693.9 | 400 | 99.3 | 0 |
| Ester Compound N | 0.64 | 1.3 | 719.5 | 840 | 98.5 | 0 |

Examples 1 to 10 and 13 to 16 and Comparative Examples 1 to 6

Molded Articles Made of Polylactic Acid Resins

As a polylactic acid resin composition, raw materials for a polylactic acid resin composition as listed in Tables 3 to 5 were melt-kneaded with a twin-screw extruder (PCM-45, manufactured by Ikegai Ironworks Corp.) at a rotational speed of 100 r/min and a kneading temperature of 190° C., the kneaded mixture was strand-cut, to provide pellets of a polylactic acid resin composition. The pellets obtained were dried at 70° C. under a reduced pressure for one day, so as to have a water content of 500 ppm or less. The dried pellets were injection-molded with an injection molding machine (manufactured by The Japan Steel Works, Ltd., J75E-D) of which cylinder temperature was set at 200° C., at a die temperature of 80° C. with a cooling time of 45 seconds, to provide molded articles [flat test pieces (70 mm×40 mm×3 mm), rectangular test pieces (125 mm×12 mm×6 mm)].

Example 11

Molded Article Made of Polybutylene Succinate

The same procedures as in Example 1 were carried out except that polybutylene succinate was used in place of the polylactic acid resin in Example 1 to prepare pellets of the resin composition using the raw materials of the composition as listed in Table 4. Thereafter the pellets were dried, so as to have a water content of 500 ppm or less. The dried pellets were injection-molded with the injection molding machine of which cylinder temperature was set at 200° C., at a die temperature of 30° C. with a cooling time of 45 seconds, to provide a molded article [flat test pieces (70 mm×40 mm×3 mm), rectangular test pieces (125 mm×12 mm×6 mm)].

Example 12

Molded Article Made of Polylactic Acid-Polypropylene Alloy Resin

The same procedures as in Example 1 were carried out for melting kneading, except that the pellets of the polylactic acid resin composition after melt-kneading obtained in Example 1, polypropylene, and a compatibilizing agent were melt-kneaded in a compositional ratio as listed in Table 4, and that the rotational speed of the twin-screw extruder was changed from 100 r/min to 500 r/min, to provide pellets of the resin composition. Thereafter, the pellets were dried, so as to have a water content of 500 ppm or less. The dried pellets were injection-molded with the injection molding machine of which cylinder temperature was set at 200° C., at a die temperature of 80° C. with a cooling time of 45 seconds, to provide a molded article [flat test pieces (70 mm×40 mm×3 mm), rectangular test pieces (125 mm×12 mm×6 mm)].

Here, the raw materials in Tables 3 to 5 are as follows.
<Aliphatic Polyester>
*1: A polylactic acid resin, manufactured by Nature Works LLC, poly-L-lactic acid, Nature Works 4032D, optical purity: 98.5%, melting point: 160° C., weight-average molecular weight: 141,000, remaining monomer: 1200 ppm
*8: Polybutylene succinate, manufactured by Showa Highpolymer Co., Ltd., Bionelle 1001
<Other Resin>
*9: Polypropylene, manufactured by Japan Polypropylene Corporation, BC03B
<Ester Compound>
Ester Compounds A to N: as listed in Tables 1 and 2

<Plasticizer>
*2: Methoxy-PEG-400, polyethylene glycol monomethyl ether, manufactured by TOHO Chemical Industry Co., LTD., acid value: 0.08 mgKOH/g, hydroxyl value: 142.4 mgKOH/g, number-average molecular weight: 390, ether group value: 20.9 mmol/g
*3: Methoxy-PEG-1000, polyethylene glycol monomethyl ether, manufactured by TOHO Chemical Industry Co., LTD., acid value: 0.15 mgKOH/g, hydroxyl value: 56.6 mgKOH/g, number-average molecular weight: 990, ether group value: 22.0 mmol/g
<Crystal Nucleating Agent>
*4: ECOPROMOTE, a zinc salt of unsubstituted phenylphosphonic acid, manufactured by NISSAN CHEMICAL INDUSTRIES, LTD.
*5: SLIPACKS H, ethylenebis-12-hydroxystearic amide, Nippon Kasei Chemical Co., Ltd.
<Hydrolysis Inhibitor>
*6: Stabaxol I-LF, manufactured by Rhein Chemie
<Inorganic Filler>
*7: MICRO ACE P-6, manufactured by Nippon Talc
<Compatibilizing Agent>
*10: Bondfast 20C, manufactured by Sumitomo Chemical Co., Ltd.

The properties of the resulting molded articles were evaluated in accordance with the methods of the following Test Examples 1 to 4. The results are shown in Tables 3 to 5.

Test Example 1

Measurement of Aldehydes

Three flat test pieces (70 mm×40 mm×3 mm) made of a resin composition were placed in a 10-L sampling bag (Tedlar bag, previously cleaned) manufactured by GL Science. The air inside the bag was replaced with nitrogen 3 times, accurately 3 L of nitrogen was then placed in the bag using a gas gauge (or gas meter), and the bag was tightly sealed, and stored in a thermostatic oven held at 65° C. for 2 hours. The temperature was lowered to room temperature (25° C.), and the internal gas was allowed to pass through a silica gel cartridge immersed in 2,4-dinitrophenylhydrazine (DNPH) (Presep-C DNPH) manufactured by Wako Pure Chemical Industries, Ltd. with a sampling pump at a rate of 0.5 L/min. Next, the cartridge containing this internal gas was removed, acetonitrile was injected at a rate of 1.5 mL/min, the captured contents were eluted into a 5-mL measuring flask, and the measuring flask was filled to the brim. This eluted solution was subjected to high-performance liquid chromatography (HPLC) under the following conditions, and formaldehyde and acetaldehyde were quantified by applying a calibration curve previously prepared from six kinds of aldehyde-DNPH mixed standard solutions manufactured by Wako Pure Chemical Industries, Ltd. to calculate the amount of each of aldehydes generated from the test piece (calculated as μg/80 cm$^2$). The lower the numerical figure, the smaller the amount of aldehydes generated, which is more excellent.

<HPLC Measurement Conditions>
HPLC column: manufactured by Waters Corporation, Symmetry C18, 4.6×150 mm
Temperature: 40° C.
Mobile phase:

| Gradient Analysis [A solution] water [B solution] acetonitrile | |
|---|---|
| Time (min) | % B |
| 0 | 40 |
| 8 | 66 |
| 8.5 | 100 |
| 17 | 100 |

Detector: UV 360 nm
Amount Injected: 20 μL

Test Example 2

Flexural Modulus

A bending test was carried out for rectangular test pieces (125 mm×12 mm×6 mm) with TENSILON (manufactured by Orientec Co., LTD., TENSILON Tensile Tester RTC-1210A, as prescribed in JIS K7203, with setting a crosshead speed to 3 mm/min to obtain flexural modulus. The lower the flexural modulus, the more excellent the flexibility.

Test Example 3

Heat Resistance

A temperature at which a rectangular test piece (125 mm×12 mm×6 mm) was bowed for 0.25 mm at a load of 1.80 MPa was measured with a thermal deformation temperature measurement instrument (manufactured by Toyo Seiki, B-32) as prescribed in JIS-K7191 as a heat deformation temperature (° C.). The higher the heat deformation temperature, the more excellent the heat resistance.

Test Example 4

Bleeding Resistance

A flat test piece (70 mm×40 mm×3 mm) made of a resin composition was allowed to stand in a room held at 25° C. and a relative humidity of 60% for 28 days, and the bleeding property was evaluated by visual examination and feel with hands in the following three ranks:
3: no bleeding is recognized;
2: slight bleeding is recognized; and
1: evidently bleeding is recognized.

TABLE 3

| | | Examples | | | | | | | Comparative Examples | | | |
|---|---|---|---|---|---|---|---|---|---|---|---|---|
| | | 1 | 2 | 3 | 4 | 5 | 6 | 7 | 1 | 2 | 3 | 4 |
| Aliphatic Polyester | Polylactic Acid Resin NW 4032D*$^1$ | 100 | 100 | 100 | 100 | 100 | 100 | 100 | 100 | 100 | 100 | 100 |
| Plasticizer | Ester Compound A | 12.5 | — | — | — | — | — | — | — | — | — | — |
| | Ester Compound B | — | 12.5 | — | — | — | — | — | — | — | — | — |
| | Ester Compound C | — | — | 12.5 | — | — | — | — | — | — | — | — |
| | Ester Compound D | — | — | — | 12.5 | — | — | — | — | — | — | — |

TABLE 3-continued

|  |  | Examples |  |  |  |  |  |  | Comparative Examples |  |  |  |
|---|---|---|---|---|---|---|---|---|---|---|---|---|
|  |  | 1 | 2 | 3 | 4 | 5 | 6 | 7 | 1 | 2 | 3 | 4 |
|  | Ester Compound E | — | — | — | — | 12.5 | — | — | — | — | — | — |
|  | Ester Compound F | — | — | — | — | — | 12.5 | — | — | — | — | — |
|  | Ester Compound G | — | — | — | — | — | — | 12.5 | — | — | — | — |
|  | Ester Compound H | — | — | — | — | — | — | — | 12.5 | — | — | — |
|  | Methoxy-PEG-400*[2] | — | — | — | — | — | — | — | — | 12.5 | — | — |
|  | Methoxy-PEG-1000*[3] | — | — | — | — | — | — | — | — | — | 12.5 | — |
| Crystal Nucleating | ECOPROMOTE*[4] | 0.5 | 0.5 | 0.5 | 0.5 | 0.5 | 0.5 | 0.5 | 0.5 | 0.5 | 0.5 | 0.5 |
| Agent | SLIPACKS H*[5] | 0.5 | 0.5 | 0.5 | 0.5 | 0.5 | 0.5 | 0.5 | 0.5 | 0.5 | 0.5 | 0.5 |
| Hydrolysis Inhibitor | Stabaxol I-LF*[6] | 1.0 | 1.0 | 1.0 | 1.0 | 1.0 | 1.0 | 1.0 | 1.0 | 1.0 | 1.0 | 1.0 |
| Inorganic Filler | MICRO ACE P-6*[7] | 10 | 10 | 10 | 10 | 10 | 10 | 10 | 10 | 10 | 10 | 10 |
| Molded Article | Formaldehyde (μg/80 cm$^2$) | 0.1 | 0.1 | 0.2 | 0.1 | 0.0 | 0.1 | 0.1 | 0.1 | 4.2 | 6.5 | 0.1 |
|  | Acetaldehyde (μg/80 cm$^2$) | 0.8 | 0.9 | 2.7 | 2.2 | 0.9 | 1.6 | 4.7 | 3.1 | 14.2 | 14.3 | 0.8 |
|  | Flexural Modulus(G/Pa) | 1.4 | 1.4 | 2.2 | 1.8 | 1.9 | 1.9 | 2.6 | 3.1 | 1.7 | 2.1 | 5.2 |
|  | Heat Resistance (Heat Deformation Temperature, °C.) | 127 | 125 | 123 | 123 | 121 | 120 | 118 | 100 | 110 | 105 | 120 |
|  | Bleeding Resistance | 3 | 3 | 3 | 3 | 3 | 3 | 2 | 1 | 3 | 3 | 3 |

*The amounts of the raw materials used are expressed in parts by weight.

TABLE 4

|  |  | Examples |  |  |  |  |
|---|---|---|---|---|---|---|
|  |  | 8 | 9 | 10 | 11 | 12 |
| Aliphatic Polyester | Polylactic Acid Resin NW 4032D*[1] | 100 | 100 | 100 | — | 100 |
|  | Polybutylene Succinate Bionelle*[8] | — | — | — | 100 | — |
| Other Resins | Polypropylene BC03B*[9] | — | — | — | — | 195.7 |
| Compatibilizing Agent | Bondfast 20C*[10] | — | — | — | — | 35.6 |
| Plasticizer | Ester Compound A | 8.0 | 12.5 | 12.5 | 12.5 | 12.5 |
| Crystal Nucleating | ECOPROMOTE*[4] | 0.5 | 1.0 | — | 0.5 | 0.5 |
| Agent | SLIPACKS H*[5] | 0.5 | — | — | 0.5 | 0.5 |
| Hydrolysis Inhibitor | Stabaxol I-LF*[6] | 1.0 | 1.0 | 1.0 | 1.0 | 1.0 |
| Inorganic Filler | MICRO ACE P-6*[7] | 10 | — | 10 | 10 | 10 |
| Molded Article | Formaldehyde (μg/80 cm$^2$) | 0 | 0.1 | 0.1 | 0.1 | 0 |
|  | Acetaldehyde (μg/80 cm$^2$) | 0.5 | 0.8 | 0.8 | 0.8 | 0.3 |
|  | Flexural Modulus(G/Pa) | 2.0 | 1.4 | 1.3 | 0.6 | 1.6 |
|  | Heat Resistance (Heat Deformation Temperature, °C.) | 132 | 125 | 122 | 85 | 125 |
|  | Bleeding Resistance | 3 | 3 | 3 | 3 | 3 |

*The amounts of the raw materials used are expressed in parts by weight.

TABLE 5

|  |  | Examples |  |  |  | Comp. Examples |  |
|---|---|---|---|---|---|---|---|
|  |  | 13 | 14 | 15 | 16 | 5 | 6 |
| Aliphatic Polyester | Polylactic Acid Resin NW 4032D*[1] | 100 | 100 | 100 | 100 | 100 | 100 |
| Plasticizer | Ester Compound I | — | — | — | — | 12.5 | — |
|  | Ester Compound J | 12.5 | — | — | — | — | — |
|  | Ester Compound K | — | 12.5 | — | — | — | — |
|  | Ester Compound L | — | — | 12.5 | — | — | — |
|  | Ester Compound M | — | — | — | 12.5 | — | — |
|  | Ester Compound N | — | — | — | — | — | 12.5 |
| Crystal Nucleating | ECOPROMOTE*[4] | 0.5 | 0.5 | 0.5 | 0.5 | 0.5 | 0.5 |
| Agent | SLIPACKS H*[5] | 0.5 | 0.5 | 0.5 | 0.5 | 0.5 | 0.5 |
| Hydrolysis Inhibitor | Stabaxol I-LF*[6] | 1.0 | 1.0 | 1.0 | 1.0 | 1.0 | 1.0 |
| Inorganic Filler | MICRO ACE P-6*[7] | 10 | 10 | 10 | 10 | 10 | 10 |
| Molded Article | Formaldehyde (μg/80 cm$^2$) | 0.2 | 0.2 | 0.6 | 0 | 0 | 0 |
|  | Acetaldehyde (μg/80 cm$^2$) | 0.7 | 1.4 | 2.3 | 0.4 | 0.4 | 0.7 |
|  | Flexural Modulus(G/Pa) | 2.1 | 1.8 | 1.9 | 2.3 | 2.4 | 3.2 |
|  | Heat Resistance (Heat Deformation Temperature, °C.) | 108 | 109 | 108 | 111 | 97 | 113 |
|  | Bleeding Resistance | 3 | 3 | 3 | 3 | 1 | 3 |

*The amounts of the raw materials used are expressed in parts by weight.

It is clear from the results of Tables 3 to 5 that the molded articles of Examples show inhibition in the generation of formaldehyde and acetaldehyde, while maintaining flexibility, as compared to the molded articles of Comparative Examples, and further that the molded articles are also excellent in heat resistance and bleeding resistance. Accordingly, it is suggested that the additives for the polyester resins of the present invention have excellent plasticization efficiency, and inhibit the generation of volatile compounds.

INDUSTRIAL APPLICABILITY

Since the resin composition of the present invention inhibits the generation of volatile compounds, the resin composition can be suitably used in various industrial applications, such as daily sundries, household electric appliance parts, and automobile parts.

The invention claimed is:

1. A resin composition comprising:
   an ester compound comprising a carboxylic acid ester obtained by using the following (1) to (3):
   (1) a monohydric alcohol having an alkyl group having 1 to 4 carbon atoms;
   (2) a dicarboxylic acid having an alkylene group having 2 to 4 carbon atoms; and
   (3) a dihydric alcohol having an alkylene group having 2 to 6 carbon atoms, the ester compound having an acid value of 1.00 mgKOH/g or less, a hydroxyl value of 5.0 mgKOH/g or less, and a number-average molecular weight of from 300 to 700; and
   an aliphatic polyester.

2. The resin composition according to claim 1, wherein the ester compound has an acid value of 0.05 mgKOH/g or more and 1.00 mgKOH/g or less and a hydroxyl value of 0.1 mgKOH/g or more and 5.0 mgKOH/g or less.

3. The resin composition according to claim 1, wherein the ester compound has an ether group value of from 0 to 8 mmol/g.

4. The resin composition according to claim 1, wherein the ester compound has a number-average molecular weight of from 300 to 600.

5. The resin composition according to claim 1, wherein the monohydric alcohol having an alkyl group having 1 to 4 carbon atoms comprises at least one member selected from the group consisting of methanol and ethanol.

6. The resin composition according to claim 1, wherein the dicarboxylic acid having an alkylene group having 2 to 4 carbon atoms comprises at least one member selected from the group consisting of succinic acid, glutaric acid, and derivatives thereof.

7. The resin composition according to claim 1, wherein the dihydric alcohol having an alkylene group having 2 to 6 carbon atoms comprises at least one member selected from the group consisting of diethylene glycol, triethylene glycol, 1,2-propanediol, and 1,3-propanediol.

8. The resin composition according to claim 1, wherein the ester compound has a number-average molecular weight of from 300 to 500.

9. The resin composition according to claim 1, wherein the monohydric alcohol having an alkyl group having 1 to 4 carbon atoms comprises methanol.

10. The resin composition according to claim 1, wherein the ester compound is contained in an amount of from 1 to 50 parts by weight, based on 100 parts by weight of the aliphatic polyester.

11. The resin composition according to claim 1, wherein the aliphatic polyester comprises a polylactic acid resin.

12. The resin composition according to claim 1, further comprising a crystal nucleating agent in an amount of from 0.05 to 5 parts by weight, based on 100 parts by weight of the aliphatic polyester.

13. The resin composition according to claim 12, wherein the crystal nucleating agent comprises a compound having a hydroxyl group and an amide group in one molecule, and a metal salt of a phenylphosphonic acid.

14. A resin molded article formed by molding the resin composition as defined in claim 1.

15. A method for producing the resin composition as defined in claim 1, comprising the steps of:
   (step 1-1) carrying out an esterification reaction between the dicarboxylic acid as defined in claim and the monohydric alcohol as defined in claim 1 to synthesize a dicarboxylic acid ester;
   (step 1-2) carrying out a transesterification reaction between the dicarboxylic acid ester obtained in the step 1-1 and the dihydric alcohol as defined in claim 1, to give an ester compound comprising a carboxylic acid ester, and having an acid value of 1.00 mgKOH/g or less, a hydroxyl value of 5.0 mgKOH/g or less, and a number-average molecular weight of from 300 to 700; and
   (step 1-3) melt-kneading the ester compound obtained in the step 1-2 and the aliphatic polyester.

16. The method according to claim 15, wherein in the step 1-1, the monohydric alcohol and the dicarboxylic acid are in a molar ratio, i.e. the monohydric alcohol/the dicarboxylic acid, of from 2/1 to 20/1.

17. The method according to claim 15, wherein in the step 1-2, the dicarboxylic acid ester and the dihydric alcohol are in a molar ratio, i.e. the dicarboxylic acid ester/the dihydric alcohol, of from 1.1/1 to 15/1.

18. A method for producing the resin composition as defined in claim 1, comprising the steps of:
   (step 2-1) allowing to react the monohydric alcohol as defined in claim 1, the dicarboxylic acid as defined in claim 1, and the dihydric alcohol as defined in claim 1 at one time, to give an ester compound comprising a carboxylic acid ester, and having an acid value of 1.00 mgKOH/g or less, a hydroxyl value of 5.0 mgKOH/g or less, and a number-average molecular weight of from 300 to 700; and
   (step 2-2) melt-kneading the ester compound obtained in the step 2-1 and the aliphatic polyester.

19. The method according to claim 18, wherein in the step 2-1, the dicarboxylic acid, the monohydric alcohol, and the dihydric alcohol are in a molar ratio, i.e. the dicarboxylic acid/the monohydric alcohol/the dihydric alcohol, of from 1.1/1.1/1 to 15/100/1.

20. A molding article for automobiles formed by molding the resin composition as defined in claim 1.

* * * * *